US011595695B2

(12) United States Patent
Pettersson et al.

(10) Patent No.: US 11,595,695 B2
(45) Date of Patent: Feb. 28, 2023

(54) MEDIA BITSTREAM HAVING BACKWARDS COMPATIBILITY

(71) Applicant: Telefonaktiebolaget LM Ericsson (publ), Stockholm (SE)

(72) Inventors: Martin Pettersson, Vallentuna (SE); Rickard Sjöberg, Stockholm (SE); Mitra Damghanian, Upplands-Bro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 44 days.

(21) Appl. No.: 17/279,333

(22) PCT Filed: Sep. 24, 2019

(86) PCT No.: PCT/EP2019/075713
§ 371 (c)(1),
(2) Date: Mar. 24, 2021

(87) PCT Pub. No.: WO2020/064733
PCT Pub. Date: Apr. 2, 2020

(65) Prior Publication Data
US 2021/0400307 A1    Dec. 23, 2021

Related U.S. Application Data

(60) Provisional application No. 62/736,002, filed on Sep. 25, 2018.

(51) Int. Cl.
*H04N 19/70* (2014.01)
*H04N 19/463* (2014.01)
*H04N 19/597* (2014.01)

(52) U.S. Cl.
CPC .......... *H04N 19/70* (2014.11); *H04N 19/463* (2014.11); *H04N 19/597* (2014.11)

(58) Field of Classification Search
None
See application file for complete search history.

(56) References Cited

U.S. PATENT DOCUMENTS

| 2007/0201549 A1 | 8/2007 | Hannuksela et al. |
| 2013/0272380 A1 | 10/2013 | Chien et al. |
| 2016/0234517 A1* | 8/2016 | Samuelsson ......... H04N 19/187 |

(Continued)

FOREIGN PATENT DOCUMENTS

| JP | 2009-502055 A | 1/2009 |
| RU | 2 409 910 C2 | 1/2011 |

(Continued)

OTHER PUBLICATIONS

International Search Report and Written Opinion issued in International Application No. PCT/EP2019/075713 dated Nov. 11, 2019 (14 pages).

(Continued)

*Primary Examiner* — Christopher Braniff
(74) *Attorney, Agent, or Firm* — Rothwell, Figg, Ernst & Manbeck, P.C.

(57) ABSTRACT

Providing backward compatibility in terms of a media bitstream and a media player conforming to different versions of a media bitstream syntax specification. In one embodiment, a bitstream is made backward compatible by including in the bitstream a first entry for a feature available in the media bitstream and second entry for an updated feature available in the media bitstream, where the first entry is understood both by a media player supporting a first version of a syntax specification and a media player supporting an updated version of the syntax specification, and the second entry is understood by the media player supporting the updated version of the syntax specification, but is not understood by the media player supporting the first version of the syntax specification.

21 Claims, 18 Drawing Sheets

(56) References Cited

U.S. PATENT DOCUMENTS

| | | | |
|---|---|---|---|
| 2017/0347109 A1* | 11/2017 | Hendry | H04N 19/96 |
| 2017/0347166 A1 | 11/2017 | Wang | |
| 2018/0199071 A1 | 7/2018 | Wang et al. | |

FOREIGN PATENT DOCUMENTS

| | | |
|---|---|---|
| RU | 2 623 884 C2 | 6/2017 |
| WO | 2007/080502 A2 | 7/2007 |
| WO | 2015/047162 A1 | 4/2015 |
| WO | 2016/148848 A1 | 9/2016 |
| WO | 2017/142949 A1 | 8/2017 |

OTHER PUBLICATIONS

Pettersson, M. et al., "[OMAF] On Compact Description of Region-Wise Packing Information," No. m43436, 123 MPEG Meeting, Ljubljana Slovenia, Jul. 2018 (25 pages).

Francois, E. et al., "Signalling, Backward Compatibility and Display Adaptation for HDR/WCG Video Coding," Joint Collaborative Team on Video Coding (JCT-VC) of ITU-T SG 16 WP3 and ISO/IEC JTC 1/SC 29/WG 11, Document: JCTVC-AB1012, 28th Meeting: Torino, IT, Jul. 15-21, 2017 (36 pages).

Wang, Y. et al., "WO of ISO/IEC 23090-2 2nd edition OMAF," No. n17827, Sep. 6, 2018 (Sep. 6, 2018), 123 MPEG Meeting Ljubljana Slovenia; (Motion Picture Expert Group or ISO/IEC JTC1/SC29/WG11) (214 pages).

Choi, B. et al, "[OMAF] Draft OMAF FDIS text," 120 MPEG Meeting Macau; (Motion Picture Expert Group or ISO/IEC JTC1/SC29/WG11), No. m41922, Oct. 31, 2017 (Oct. 31, 2017) (123 pages).

Choi, B. et al., "OMAF DIS text with updates based on Berlin OMAF AHG meeting agreements", 119 MPEG Meeting; Jul. 17, 2017-Jul. 21, 2017; Torino, Italy; (Motion Picture Expert Group or ISO/IEC JTC1/SC29/WG11),No. m40849, Jul. 2017 (70 pages).

* cited by examiner

MEDIA BITSTREAM HAVING BACKWARDS COMPATIBILITY

CROSS REFERENCE TO RELATED APPLICATION(S)

This application is a 35 U.S.C. § 371 National Stage of International Patent Application No. PCT/EP2019/075713, filed Sep. 24, 2019, which claims priority to U.S. provisional patent application no. 62/736,002, filed Sep. 25, 2018. The above identified applications are incorporated by this reference.

TECHNICAL FIELD

Disclosed are embodiments related to creating and processing backwards compatible media bitstreams, such as, for example, Motion Pictures Expert Group (MPEG) bitstreams.

BACKGROUND

In recent years virtual reality (VR) has become increasingly popular. Advances in head-mounted displays (HMD) moves the barrier to make high quality VR more accessible to the mass market. Use cases for VR include gaming and VR video, also referred to as omnidirectional video or 360° video.

1. MPEG and Immersive Video

The Motion Picture Experts Group (MPEG) is currently working on some activities for immersive video to be published in the MPEG-I set of standards. One activity concerns 3 degrees of freedom (3DoF), a.k.a. 360° video, where the user may look in all directions of a sphere using a head mounted display (HMD), but with fixed head position around the origin.

Another activity concerns extended 3 degrees of freedom (3DoF+) video, where the user experiences the whole sphere as in 3DoF video but has the freedom to look around objects to some extent by slightly moving the head. To realize this technically, a 3DoF+ scene is built up from a large number of views containing both texture and depth information. Intermediate views are synthesized using texture and depth from neighboring views.

MPEG has also an activity for six degrees of freedom (6DoF) video. In 6DoF video the user has full flexibility to look around objects in a much larger volume compared to 3DoF+, enough to let the user stand and possibly walk around. The plan to realize 6DoF video includes using a combination of background video and point cloud objects. Point cloud objects are described with geometry information (points in 3D space) and attributes attached to each point in the point cloud. Attributes may include color values (e.g. RGB textures), reflectance, occupancy and opacity.

The scope for 3DoF, 3DoF+ and 6DoF is illustrated in FIG. 1. All of 3DoF, 3DoF+ and 6DoF could support stereo viewing.

2. OMAF

One part of the MPEG-I standardization effort is to develop a media format for omnidirectional video. This media format is referred to as the Omnidirectional Media Format (OMAF). The first version of OMAF has been finalized and work is ongoing on the second version of OMAF, OMAF v2, which is expected to include added functionality including support for 3DoF+ video. In combination with signaling enablers, such as, for example, Dynamic Adaptive Streaming over HTTP (DASH), OMAF is used to support signaling of omnidirectional video over the Internet.

In the first version of OMAF two video codecs are supported: (1) Advanced Video Coding (AVC)/H.264 and (2) High Efficiency Coding (HEVC). Both codecs have been developed in the Joint Collaboration Team on Video Coding (JCT-VC), a collaboration effort between MPEG and ITU-T. MPEG and ITU-T are currently working on the next generation video codec, referred to as Versatile Video Codec (VVC), within the Joint Video Experts Team (JVET). VVC, which is likely to be supported by a future version of OMAF, is anticipated to have even better support for omnidirectional video than AVC and HEVC.

3. Projection Formats

Depending on the camera (or rig of cameras) and how the camera is capturing the 360° video, different projection formats exist. Two common projection formats supported by OMAF are: (1) equirectangular projection and (2) cube map projection. The equirectangular projection format can be easily explained with a world map, where the equator is ranging from left to right and with the pixels at the poles stretched along the top and bottom borders. The granularity is thus higher at the poles. The cube map projection is built up by six 2D video projections in the shape of a cube. A cube map video may be created by capturing 2D video with six cameras in six different orthogonal directions: up, down, front, back, left and right. FIG. 2 shows an example of a typical cube map.

To efficiently compress 360° video, the projected video format captured by the camera is typically packed into a picture that is more suitable for compression. This picture is referred to as a packed picture. After decoding the packed picture, the packed picture is unpacked to a picture with the projection format, referred to as a projected picture, before rendered to a HMD or display.

A simple use case for when packing a projected picture into a packed picture is useful is for the equirectangular projection format. Since the poles in equirectangular projections have higher granularity than the rest of the projected picture, the packed picture for compression may be compressed in terms of pixels at the poles. This is exemplified in FIG. 3 where the top and bottom areas are shrunk in the packed picture compared to the projected picture.

FIG. 4 shows an example of a typical use case for 360° video, where a 360° camera captures a scene and sends the 360° video to a server. The server then sends the video to a user with an HMD. The resolution of the projected picture may be larger than the resolution of the packed picture.

One observation that is easy to make is that the user only sees the video content in one direction at a time on the sphere. What is seen by the user on the sphere is referred to as the viewpoint. What is outside the viewpoint is not seen by the user and it is wasteful to send video data in this area, at least in high quality.

4. Tiled Video

One of the features in OMAF is to support tiling of video. Tiles of a picture are sometimes referred to as regions of a picture. A tiled video is built up by a number of tiles that are independently coded from each other, which means that a single tile can be extracted from the encoded bitstream and also be independently decoded. This is utilized in 360° video streaming to only send the tiles that are covering the current viewport in high quality. The other tiles may be skipped or transmitted at a lower quality.

FIG. 5 shows an example of a typical use case where tiles are utilized to enable high quality for the viewport and lower quality for the other area. As shown in FIG. 5, a camera captures 360° video and sends it to a server. The server creates a high quality and a low-quality version of the 360° video. The video is streamed using OMAF and DASH to a user with a HMD device. The HMD device detects in what direction the user is viewing and requests high quality tiles for the viewport and low-quality tiles for the remaining area. The server packs the requested high-quality tiles and low-quality tiles into a packed video picture and sends it to the HMD. The HMD unpacks the picture and projects the packed tiles at the right place on the projected picture.

5. Guard Bands

In OMAF, there is an option to use guard bands in the packed picture to improve the image quality when stitching tiles for projection. Guard bands may be used to seamlessly blend the borders between two regions. A guard band is defined in OMAF as an area in a packed picture that is not rendered but may be used to improve the rendered part of the packed picture to avoid or mitigate visual artifacts such as seams from stitching together regions from the packed picture. FIG. 6 illustrates an example of a projected picture with a projected region and its corresponding packed region in a packed picture with guard bands around it.

6. Region-wise Packing

OMAF supports 255 different regions for the packed picture. The region-wise packing in OMAF defines how regions in the packed picture are unpacked into regions in the projected picture. After decoding the regions in the packed picture, the regions are projected to the regions of the projected picture using the region-wise packing information in the bitstream, before being rendered to a display or HMD.

The syntax and semantics of the region-wise packing in the current OMAF v2 working draft (WD) (m17827 v1) is shown below in the tables and description below.

TABLE 1

```
7.5.3.2    Syntax of the rectangular region packing structure
aligned(8) class RectRegionPacking(i) {
    unsigned int(32) proj_reg_width[i];
    unsigned int(32) proj_reg_height[i];
    unsigned int(32) proj_reg_top[i];
    unsigned int(32) proj_reg_left[i];
    unsigned int(3) transform_type[i];
    bit(5) reserved = 0;
    unsigned int(16) packed_reg_width[i];
    unsigned int(16) packed_reg_height[i];
    unsigned int(16) packed_reg_top[i];
    unsigned int(16) packed_reg_left[i];
}
```
7.5.3.3 Semantics of the rectangular region packing structure
  proj_reg_width[i], proj_reg_height[i],proj_reg_top[i], and proj_reg_left[i] specify the width,
    height, top offset, and left offset, respectively, of the i-thprojected region, either within
    the projected picture (when constituent_picture_matching_flag isequal to 0) or within the
    constituent picture of the projected picture (whenconstituent_picture_matching_flag is
    equal to 1). proj_reg_width_[i],proj_reg_height[i], proj_reg_top[i] and proj_reg_left[i] are
    indicated in relative projected picture sample units.
      NOTE 1:    Two projected regions may partially or entirely overlap with each other.
                 When there is an indication of quality difference, e.g., by a region-wise
                 quality ranking indication, then for the overlapping area of any two
                 overlapping projected regions, the packed region corresponding to the
                 projected region that is indicated to have higher quality should be used
                 for rendering.
  transform_type[i] specifies the rotation and mirroring that isapplied to the i-th packed region
    to remap it to the i-th projected region. Whentransform_type[i] specifies both rotation
    and mirroring, rotation is applied before mirroring for convertingsample locations of a
    packed region to sample locations of a projected region. Thefollowing values are
    specified:
      0: no transform
      1: mirroring horizontally
      2: rotation by 180 degrees (counter-clockwise)
      3: rotation by 180 degrees (counter-clockwise) beforemirroring horizontally
      4: rotation by 90 degrees (counter-clockwise) before mirroringhorizontally
      5: rotation by 90 degrees (counter-clockwise)
      6: rotation by 270 degrees (counter-clockwise) beforemirroring horizontally
      7: rotation by 270 degrees (counter-clockwise)
      NOTE 2:    Clause 5.4.2 specifies the semantics of transform_type[i] forconverting
                 a sample location of a packed region in a packed picture to a sample
                 location of a projected region in a projected picture.
  packed_reg_width[i], packed_reg_height[i],packed_reg_top[i], and packed_reg_left[i]
    specify the width, height, the offset, and the left offset,respectively, of the i-th packed
    region, either within the packed picture (whenconstituent_picture_matching_flag is equal
    to 0) or within each constituent picture of the packed picture(when
    constituent_picture_matching_flag is equal to 1).packed_reg_width[i]
    packed_reg_height[i], packed_reg_top[i], andpacked_reg_left[i] are indicated in relative
    packed picture sample units. packed_reg_width[i],packed_reg_height[i],
    packed_reg_top[i], and packed_reg_left[i] shallrepresent integer horizontal and vertical
    coordinates of luma sample units within the decodedpictures.
      NOTE 3:    Two packed regions may partially or entirely overlap with each other.

TABLE 2

7.5.3.4    Syntax of the guard band structure
```
aligned(8) class GuardBand(i) {
    unsigned int(8) left_gb_width[i];
    unsigned int(8) right_gb_width[i];
    unsigned int(8) top_gb_height[i];
    unsigned int(8) bottom_gb_height[i];
    unsigned int(1) gb_not_used_for_pred_flag[i];
    for (j = 0; j < 4; j++)
        unsigned int(3) gb_type[i][j];
    bit(3) reserved = 0;
}
```
7.5.3.5    Semantics of the guard band structure left_gb_width[i] specifies the width of the guard band on theleft side of the i-th packed region in relative packed picture sample units. When the decodedpicture has 4:2:0 or 4:2:2 chroma format, left_gb_width[i] shall correspond toan even number of luma samples within the decoded picture. right_gb_width[i]specifies the width of the guard band on the right side of the i-th packed region in relative packedpicture sample units. When the decoded picture has 4:2:0 or 4:2:2 chroma format,right_gb_width[i] shall correspond to an even number of luma samples within the decodedpicture. top_gb_height[i] specifies the height of the guard bandabove the i-th packed region in relative packed picture sample units. When the decoded picture has4:2:0 chroma format, top_gb_height[i] shall correspond to an even number ofluma samples within the decoded picture. bottom_gb_height[i] specifies the height of theguard band below the i-th packed region in relative packed picture sample units. When the decodedpicture has 4:2:0 chroma format, bottom_gb_height[i] shall correspond to aneven number of luma samples within the decoded picture.

When GuardBand(i) is present, at least one ofleft_gb_width[i], right_gb_width[i], top_gb_height[i], or bottom gb_height[i] shallbe greater than 0.

gb_not_used_for_pred_flag[i] equal to 0 specifies that theguard bands may or may not be used in the inter prediction process.gb_not_used_for_pred_flag[i] equal to 1 specifies that the sample values of the guard bands are not used in the interprediction process.

NOTE 1:   When gb_not_used_for_pred_flag[i] is equal to 1, the samplevalues within guard bands in decoded pictures could be rewritten even if the decoded pictures were used as references for inter prediction of subsequent pictures to be decoded. For example, the content of a packed region could be seamlessly expanded to its guard band with decoded and re-projected samples of another packed region.

gb_type[i][j] specifies the type of the guard bandsfor the i-th packed region as follows, with j equal to 0, 1, 2, or 3 indicating that the semantics below applyto the left, right, top, or bottom edge, respectively, of the packed region:
  - gb_type[i][j] equal to 0 specifies that the content ofthe guard bands in relation to the content of the packed regions is unspecified. Whengb_not_used_for_pred_flag[i] is equal to 0, gb_type[i][j] shall not be equal to0.
  - gb_type[i][j] equal to 1 specifies that the content ofthe guard bands suffices for interpolation of sub-pixel values within the packed region and less than onepixel outside of the boundary of the packed region.
    NOTE 2:   gb_type[i][j] equal to 1 could be used when the boundarysamples of a packed region have been copied horizontally or vertically to the guard band.
  - gb_type[i][j] equal to 2 specifies that the content ofthe guard bands represents actual picture content that is spherically adjacent to the content in the packedregion and is on the surface of the packed region at quality that gradually changes fromthe picture quality of the packed region to that of the spherically adjacent packedregion.
  - gb_type[i][j] equal to 3 specifies that the content ofthe guard bands represents actual picture content that is spherically adjacent to the content in the packedregion and is on the surface of the packed region at the picture quality of the packedregion.
  - gb_type[i][j] values greater than 3 arereserved.

TABLE 3

7.5.3.6    Syntax of the region-wise packing structure
```
aligned(8) class RegionWisePackingStruct( ) {
    unsigned int(1) constituent_picture_matching_flag;
    bit(7) reserved = 0;
    unsigned int(8) num_regions;
    unsigned int(32) proj_picture_width;
    unsigned int(32) proj_picture_height;
    unsigned int(16) packed_picture_width;
    unsigned int(16) packed_picture_height;
    for (i = 0; i < num_regions; i++) {
        bit(3) reserved = 0;
        unsigned int(1) guard_band_flag[i];
        unsigned int(4) packing_type[i];
        if (packing_type[i] == 0) {
            RectRegionPacking(i);
            if (guard_band_flag[i])
                GuardBand(i);
```

TABLE 3-continued

```
        }
    }
}
```
7.5.3.7 Semantics of the region-wise packing structure
  constituent_picture_matching_flag equal to 1 specifies that theprojected region information,
    packed region information, and guard band region information inthis syntax structure
    apply individually to each constituent picture and that the packedpicture and the
    projected picture have the same stereoscopic frame packingformat.
    constituent_picture_matching_flag equal to 0 specifies that theprojected region
    information, packed region information, and guard band regioninformation in this syntax
    structure apply to the projected picture. WhenSpatiallyPackedStereoFlag is equal to 0,
    constituent_picture_matching_flag shall be equal to 0.
      NOTE 1:   For the stereoscopic content that uses equivalent region-wise packing
                for the constituent pictures, setting this flag equal to 1 allows more
                compact signalling of region-wise packing information.
  num_regions specifies the number of packed regions when
    constituent_picture_matching_flag is equal to 0. Value 0 isreserved. When
    constituent_picture_matching_flag is equal to 1, the total numberof packed regions is
    equal to 2 * num_regions and the information inRectRegionPacking(i) and GuardBand(i)
    applies to each constituent picture of the projected picture andthe packed picture.
  proj_picture_width and proj_picture_height specify the width and height,respectively, of the
    projected picture, in relative projected picture sample units.proj_picture_width and
    proj_picture_height shall both be greater than 0.
      NOTE 2:   The same sampling grid, width, and height are used for the luma sample
                array and the chroma sample arrays of the projected picture.
  packed_picture_width and packed_picture_height specify the width andheight, respectively,
    of the packed picture, in relative packed picture sample units.packed_picture_width and
    packed_picture_height shall both be greater than 0.
  guard_band_flag[i] equal to 0 specifies that the i-th packedregion has no guard bands.
    guard_band_flag[i] equal to 1 specifies that the i-thpacked region has at least one guard
    band.
  packing_type[i] specifies the type of region-wisepacking.
  RectRegionPacking(i) specifies the region-wise packing between the i-thpacked region and
    the i-th projected region.
  GuardBand(i) specifies the guard bands for the i-th packed region. Thesyntax and semantics
    of GuardBand(i) are specified in clauses 0 and 0,respectively.

TABLE 4

7.6.4         Region-wise packing box
7.6.4.1         Definition
Box Type:       'rwpk'
Container:      ProjectedOmniVideoBox
Mandatory:      No
Quantity:       Zero or one
RegionWisePackingBox specifies the mapping between packed regions and the corresponding
projected regions and specifies the location and size of the guard bands, if any.
      NOTE:       Among other information the RegionWisePackingBox also provides the
                  content coverage information in the 2D Cartesian picture domain.
7.6.4.2         Syntax
aligned(8) class RegionWisePackingBox extends FullBox('rwpk', 0, 0) {
    RegionWisePackingStruct( );
}
7.6.4.3         Semantics
Clause 7.5.3 applies with the following additional constraint:
  - packed_picture_width and packed_picture_height shall have such values that
    packed_picture_width is an integer multiple of width and packed_picture_height is an
    integer multiple of height, where width and height are syntax elements of the
    VisualSampleEntry containing this box.

TABLE 5

7.10.6                  Region-wise packing item property
7.10.6.1                  Definition
Box type:                       'rwpk'
Property type:                  Descriptive item property
Container:                      ItemPropertyContainerBox
Mandatory (per an item):        No
Quantity (per an item):         Zero or one
RegionWisePackingProperty specifies the mapping between packed regions and the
corresponding projected regions and specifies the location and size of the guard bands, if any.
essential shall be equal to 1 for a 'rwpk' item property.
7.10.6.2                        Syntax
aligned(8) class RegionWisePackingProperty
extends ItemFullProperty('rwpk', 0, 0) {

TABLE 5-continued

RegionWisePackingStruct( ); /* specified in clause 7.5.3 */
}
7.10.6.3            Semantics
Clause 7.5.3 applies with the following additional constraint:
  - packed_picture_width and packed_picture_height shall have such values that
    packed_picture_width is an integer multiple of image_width and packed_picture_height
    is an integer multiple of image_height, where image_width and image_height are syntax
    elements of the ImageSpatialExtentsProperty associated to the image item.

The OMAF specification also mentions "The absence of RegionWisePackingBox indicates that no region-wise packing is applied, i.e., that the packed picture is identical to the projected picture". This is thus the default behavior when the RegionWisePackingBox is missing.

7. Compact Description of Region-Wise Packing Information

A proposal was introduced to have a more compact representation of the region-wise packing information. The proposal consisted of the following three different parts.

(1) Scale factor—Signal a scale factor and scaled values with reduced number of bits for the width, height, top and left offsets for projected and packed regions in the rectangular region packing structure. A flag is used to indicate if scaling is to be used.

(2) Copy size—Signal the region width and height only for the first region if all regions have the same size. A flag is used for each of the projected and packed picture to indicate whether all regions have the same size.

(3) Raster scan order—Do not signal the top and left offsets of the regions if all regions are ordered in raster scan order. The offsets can be reconstructed on the receiver side using the picture width and the widths and heights of the regions. A flag is used for each of the projected and packed picture to indicate whether all regions are ordered in raster scan order.

The above described proposal was proposed to MPEG in the contribution "m43436—On Compact Description of Region-Wise Packing information". The contribution was adopted in the OMAF Technology under Consideration (TuC) document.

SUMMARY

The aforementioned proposal provides means for a more compact description of the region-wise packing information in OMAF bitstreams and files, but a drawback of the proposal is that it is not backwards compatible with the previous version of OMAF, OMAF v1.

A media player only supporting OMAF v1 will not be able to properly parse a media bitstream with the updated RegionWisePackingBox. Because the media player thinks the RegionWisePackingBox conforms to OMAF v1, the player will try to parse the bits in the box according to the OMAF v1 specification, but since the bits are written according to the updated specification of RegionWisePackingBox in the updated version of OMAF, it will fail, and possibly crash.

This problem is not only present for the region-wise packing information functionality in OMAF, but also for any situation where an update of a functionality is made for a media bitstream syntax specification where backwards compatibility is wanted when a media player only supporting a first version of the media bitstream syntax specification is expected to be able to parse a media bitstream supporting the updated version of the media bitstream syntax specification.

This disclosure describes embodiments for providing backward compatibility in terms of a media bitstream and a media player conforming to different versions of a media bitstream syntax specification.

In one embodiment, a bitstream is made backward compatible by including in the bitstream a first entry (e.g. first box) for a feature available in the media bitstream and second entry (e.g., second box) for an updated feature available in the media bitstream, where the first entry is understood both by a media player supporting a first version of a syntax specification and a media player supporting an updated version of the syntax specification and the second entry is understood by the media player supporting the updated version of the syntax specification but is not understood by the media player supporting the first version of the syntax specification. For example, the first entry contains the original feature of the first version of the syntax specification and the second entry contains the updated feature of the updated version of the syntax specification. In this way, it can be ensured that the media bitstream is backwards compatible with a media player only supporting the first version of the syntax specification, while still providing the updated feature for a media player supporting the updated version of the syntax specification.

An advantage of the proposed embodiment is that backwards compatibility can be provided for a media bitstream syntax specification where it is expected that a media player only supporting a first version of the media bitstream syntax specification shall be able to parse a media bitstream conforming to the updated version of the media bitstream syntax specification.

In another, more specific embodiment, a more compact description of the region-wise packing information that is backwards compatible with the previous version of the OMAF specification is provided. This is done in one embodiment by adding a new box to the new version of OMAF, ExtendedRegionWisePackingBox, that provides a more compact description of the region-wise packing information and adds functionalities for more extensive realizations of the region-wise packing. By also including an original region-wise packing box first defined in the previous version of the OMAF specification, backwards compatibility can be ensured. To keep the bitrate down, the original region-wise packing box may provide a simplified but valid mapping between the packed picture and the projected picture. An advantage of this more specific embodiment is that backwards compatibility is provided for the region-wise packing information functionality when updating the OMAF specification with functionality that provides a more compact description of the region-wise packing information.

BRIEF DESCRIPTION OF THE DRAWINGS

The accompanying drawings, which are incorporated herein and form part of the specification, illustrate various embodiments.

DETAILED DESCRIPTION

Figure 1:
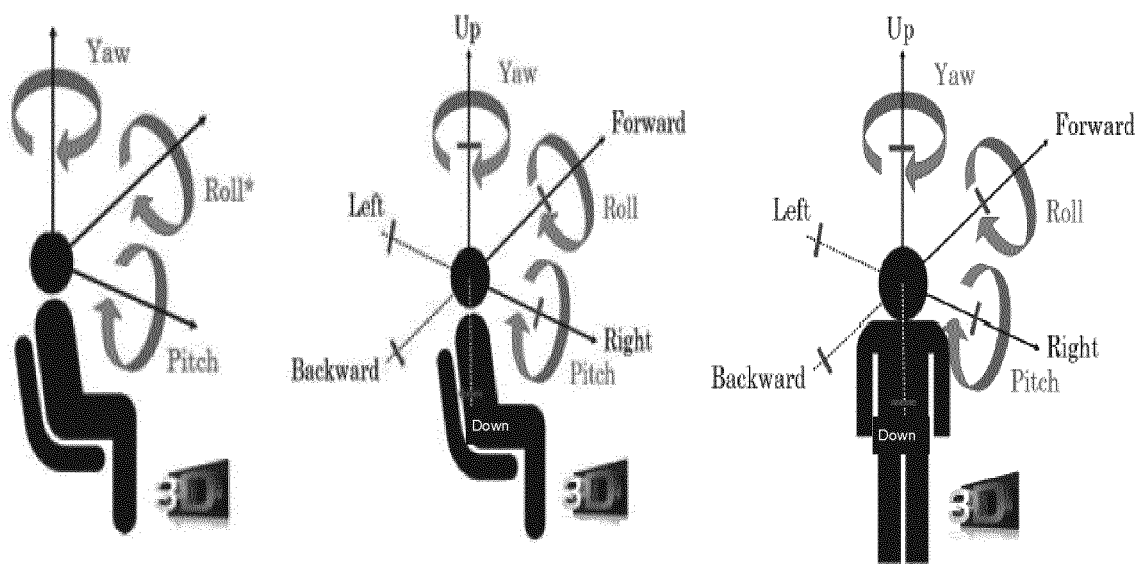
FIG. 1 illustrates three examples of immersive video.
Figure 2:
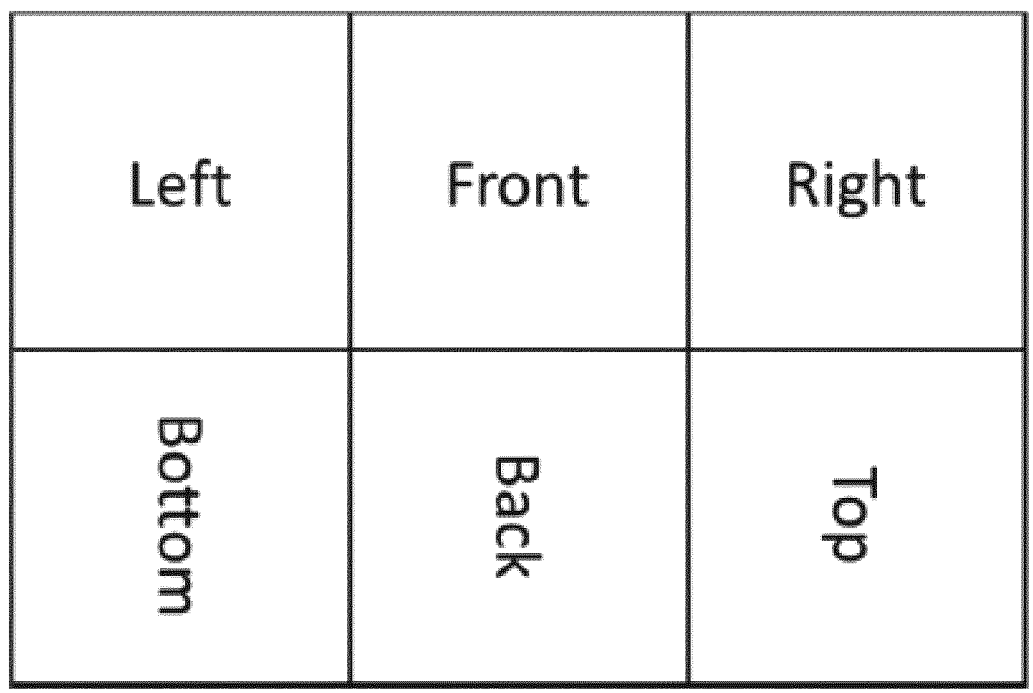
FIG. 2 shows an example of a typical cube map.
Figure 3:
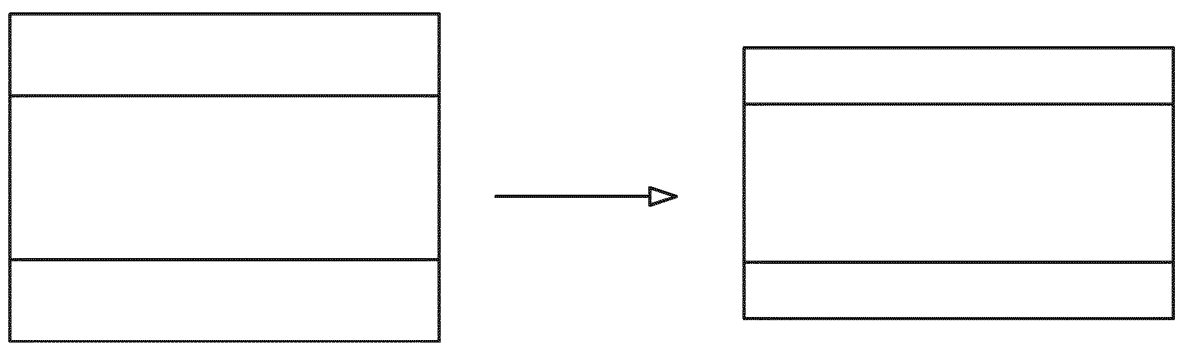
FIG. 3 illustrates an example of packing a projected equirectangular picture into a packed picture that is more suitable for compression.
Figure 4:
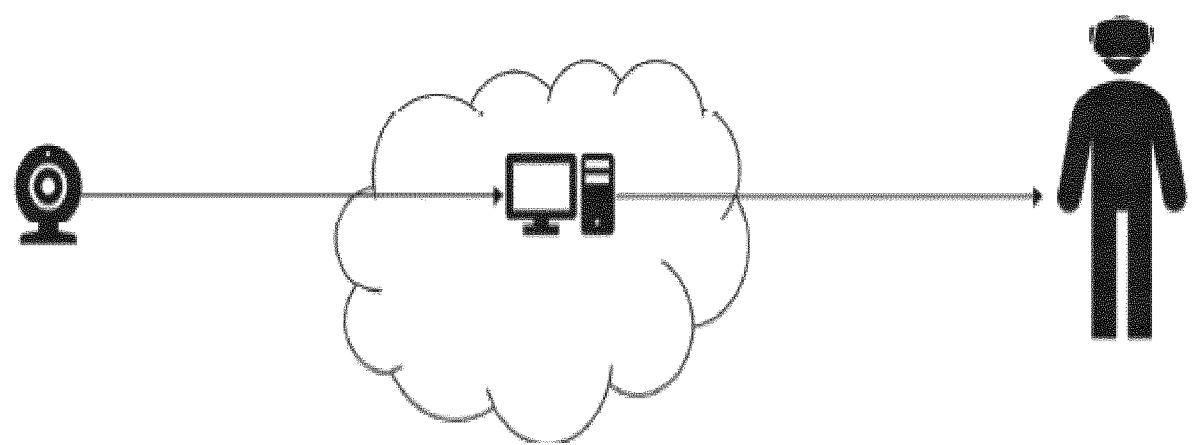
FIG. 4 illustrates a typical use case for 360° video.
Figure 5:
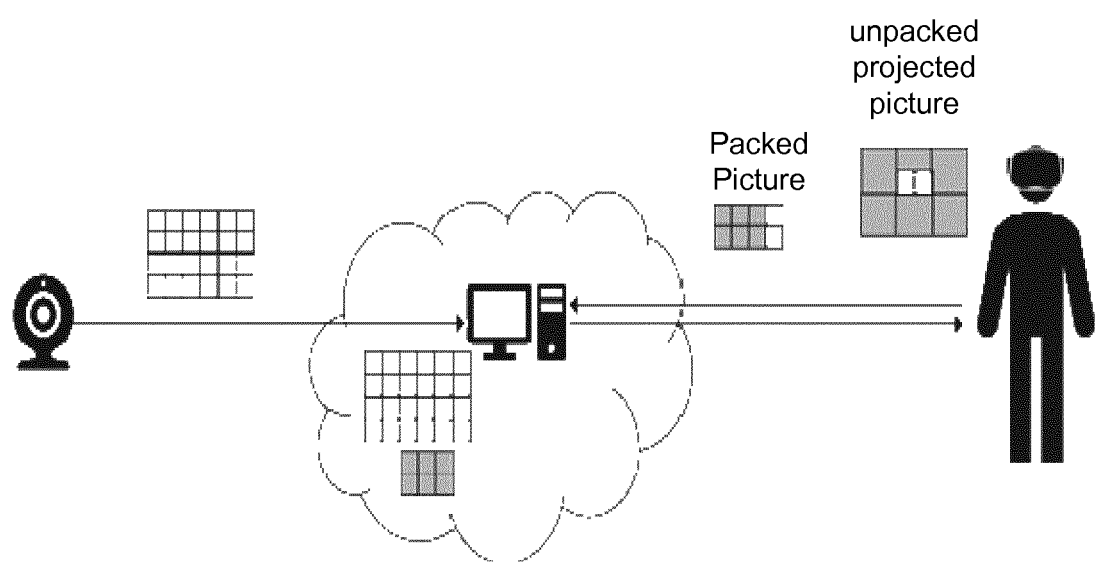
FIG. 5 illustrates an example use case with tiles.
Figure 6:
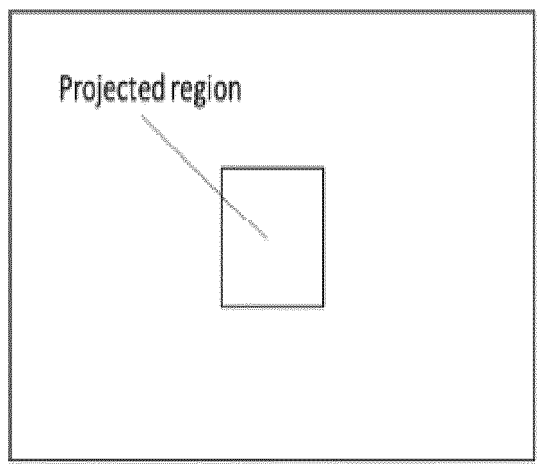
FIG. 6 illustrates a projected picture and a packed picture with guard bands around a packed region.
Figure 6:
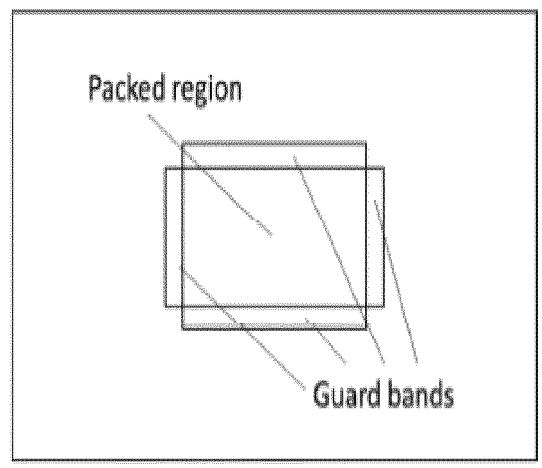

Below are some definitions of terms used in this disclosure.

"Bitstream." A bitstream is referred to as a series of bits transmitted over a network. A bitstream may alternatively be one or more data files stored on a physical medium, such as a HDD, RAM or flash memory.

"Media player." A media player is in this context a collective term for file/segment reception or file access; file/segment decapsulation; decoding of audio, video, image, or timed text bitstreams, and rendering of audio, video, images, or timed text.

"Entry." An entry is referred to as a pointer to, position of, struct with or container with, a set of syntax elements in the bitstream. An entry may be an entry, box, property or atom as referred to in ISO/IEC 14496-12 (ISO Base Media File Format (ISOBMFF)).

"Feature." A feature is referred to as a functionality in decoding or rendering the media and is described in the bitstream as a set of one or more syntax elements.

Updating Features with Backwards Compatibility

In one embodiment, a bitstream is made backward compatible by including in the bitstream a first entry (e.g. first box) for a feature available in the media bitstream and second entry (e.g., second box) for an updated feature available in the media bitstream, where the first entry is understood both by a media player supporting a first version of a syntax specification and a media player supporting an updated version of the syntax specification and the second entry is understood by the media player supporting the updated version of the syntax specification but is not understood by the media player supporting the first version of the syntax specification. For example, the first entry contains the original feature of the first version of the syntax specification and the second entry contains the updated feature of the updated version of the syntax specification. In this way, it can be ensured that the media bitstream is backwards compatible with a media player only supporting the first version of the syntax specification, while still providing the updated feature for a media player supporting the updated version of the syntax specification.

For a complex realization of the feature, by providing the complex realization in the updated feature of the second entry and providing a simple, but still valid, realization of the original feature in the first entry, it may be possible to save bits compared to only providing the complex representation in the original feature of the first entry. More specifically, if the updated feature in the second entry provides means for a more compact representation of the realization than can be achieved with original feature in the first entry, then bits could be saved.

Example

A first version of a media bitstream syntax specification contains a first version of a feature X. The first version of a media bitstream syntax specification is denoted "S1." At least a simple realization of feature X is required for correct parsing, decoding and/or rendering of the media bitstream. The feature X is contained in an entry A in the bitstream (e.g., contained in an entry E in the bitstream). The media bitstream syntax specification S1 contains a rule that unknown entries are to be ignored and not parsed.

An update/extension of the feature X, referred to as feature "X2" (or "X2"), is added to a second, updated version of the media bitstream syntax specification. The second version of the media bitstream syntax specification is denoted "S2." The feature X2 is contained in a new entry B. The second version of the media bitstream syntax specification S2 comprises, just like the first version of the media bitstream syntax specification S1, feature X in entry A. The specification S2 may specify whether feature X2 is an update or extension of the feature X.

The first version of the media bitstream syntax specification S1 may specify that an entry E may or may not contain the entry A. The second version of the media bitstream syntax specification S2 may specify that an entry E may contain: i) neither entry A nor entry B, ii) entry A and entry B, iii) entry A, but not entry B, or iv) entry B, but not entry A.

Figure 7A:
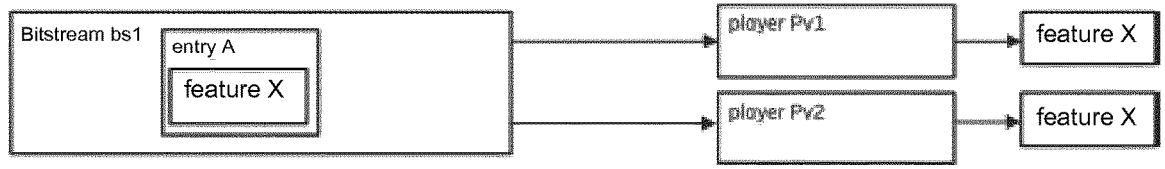
FIG. 7A illustrates a bitstream having a first entry carrying a first version of a feature.

FIG. 7A illustrates a first media bitstream BS1 (i.e., a bitstream in accordance with syntax specification S1) that contains an entry A with feature X. A player Pv1, which only supports the syntax specification S1, receives the media bitstream BS1, parses the feature X in entry A and decodes and/or renders the media accordingly. A player Pv2, which supports the syntax specification S2, also receives the media bitstream BS1, parses the feature X in entry A and decodes and/or renders the media accordingly. Hence, as illustrated in FIG. 7A an updated player Pv2 will be able to parse a bitstream conforming to the previous version of the syntax specification S1.

Figure 7B:
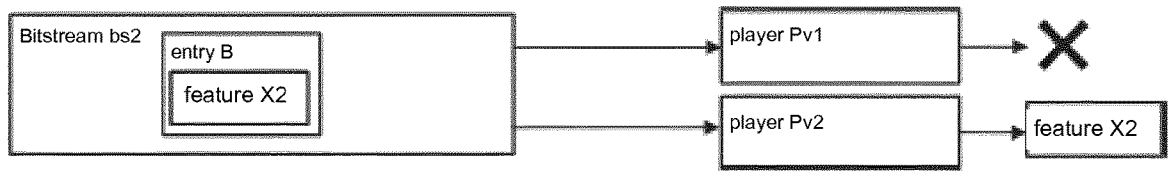
FIG. 7B illustrates a bitstream having a second entry carrying a second version of the feature.
Figure 7C:
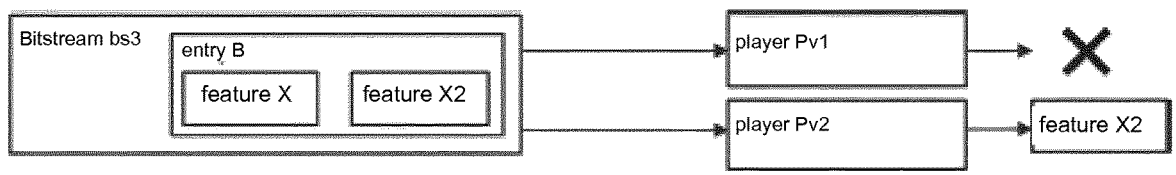
FIG. 7C illustrates a bitstream having the second entry carrying the first version of the feature and the second version of the feature.
Figure 7D:
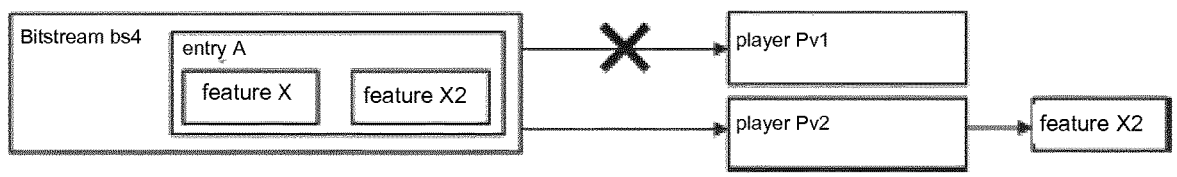
FIG. 7D illustrates a bitstream having the first entry carrying the first version of the feature and the second version of the feature.

FIG. 7B illustrates another example. As shown in FIG. 7B, a second media bitstream BS2, which supports the media bitstream syntax specification S2, contains an entry B with feature X2. When player Pv2 receives bitstream BS2 it can parse the feature X2 in entry B and decode and/or render the media accordingly. But when player Pv1 receives bitstream BS2 it does not recognize entry B and knows it cannot parse the feature X2 in entry B. Since feature X or X2 is required for proper decoding and/or rendering of the media, Pv1 fails to properly render the media. Putting both feature X and feature X2 in entry B, as illustrated with bitstream BS3 in FIG. 7C, would yield similar results for player Pv1 since Pv1 does not recognize entry B. Putting both feature X and feature X2 in entry A, as illustrated with bitstream BS4 in FIG. 7D, would create a greater problem for player Pv1 because player Pv1 recognizes entry A and expects that it can parse the content of entry A, and, thus, will not discard it automatically. But because entry A contains both feature X and feature X2, Pv1 will be unable to parse entry A and may crash trying to parse it.

Figure 8A:
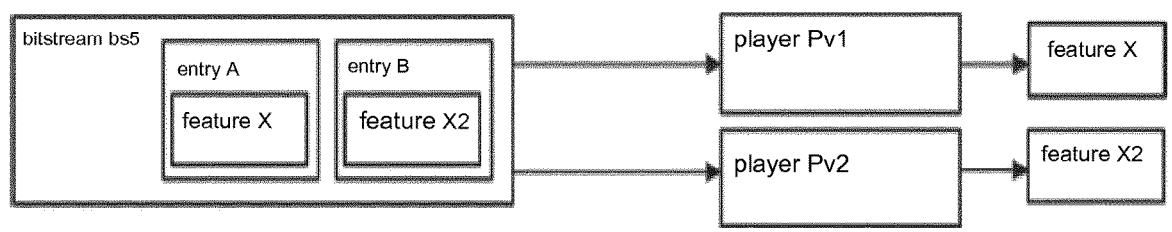
FIG. 8A illustrates a first embodiment.

If, however, a bitstream contains feature X in entry A and feature X2 in entry B, as illustrated with bitstream BS5 in FIG. 8A, then both player Pv1 and Pv2 will be able to parse their respective features. Player Pv1 will recognize entry A and parse feature X and properly decode and/or render the media. Entry B is not recognized by Pv1 and Pv1 will simply discard it. Player Pv2 finds both entry A and entry B in the bitstream and decides to discard entry A since entry B is available. Feature X2 in entry B is parsed and the media is properly decoded and/or rendered. Entry B may be positioned before entry A in the bitstream to allow entry A to be discarded once it is discovered.

If feature X2 has been updated with means to compress the representation of the realization of the feature compared to feature X it is possible to save bits for complex realizations if feature X2 is used to represent the complex realization (CR) and feature X is used to represent a simple, but valid, realization (SR) and the bit cost for this is less than if the complex realization was presented with feature X. This may be expressed as:

TABLE 6 savedBits =
bitCost ( feature X (CR) ) − ( bitCost ( feature X2 (CR) ) + bitCost ( feature X (SR) ) )

Figure 8B:
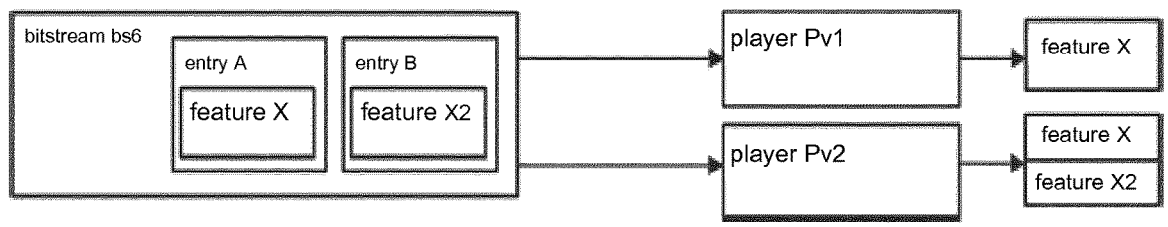
FIG. 8B illustrates a second embodiment.

In an alternative version, feature X2 is not an update of feature X, but an extension to feature X, meaning that feature X is required for feature X2. In this case player Pv2 parses both feature X of entry A and feature X2 of entry B to properly decode and/or render the media. This is illustrated in FIG. 8B.

If the simple realization (SR) is a subset of the complex realization (CR) and Pv2 parses both entry A and entry B, then the saved bits may even be approximated by:

TABLE 7 savedBits =
bitCost ( feature X (CR) ) − ( bitCost ( feature X2 (CR) ) − bitCost ( feature X2 (SR) ) + bitCost ( feature X (SR) ) )

In an alternative embodiment, the feature X in entry A is provided to basic users while the feature X2 in entry B is provided for premium users. For example, even if the basic user (i.e., a user who has subscribed only to a basic level of service) has a Pv2 player that can process feature X2, feature X2 will not be provided to the user because the user has only subscribed to the basic level of service.

A decoder of a media player Pv2 may perform the steps shown in the table below when parsing and decoding a media bitstream according to the second version of the media bitstream syntax specification S2, where the second version of the bitstream syntax S2 specifies an entry E that may contain none, any, or both of a first entry A containing a first feature X conforming to a first version of the media bitstream syntax specification S1, and a second entry B containing a second feature X2 conforming to the updated version of the media bitstream syntax specification S2.

TABLE 8

1. Start parse media bitstream
2. Start parse entry E from the bitstream
    if entry A and not entry B is contained in entry E
        parse feature X in entry A
    else if entry B and not entry A is contained in entry E,
        parse feature X2 in entry B

TABLE 8-continued

```
    else if both entry A and entry B is contained in entry E,
        parse feature X2 in entry B
        if feature X2 is an update of feature X
            discard entry A
        else if feature X2 is an extension of feature X
            parse feature X in entry A
            combine feature X and feature X2
3. If either of entry A or entry B is contained in entry E, decode and/or render the
media bitstream using the parsed feature(s)
```

A media bitstream encoder may perform the steps shown in the table below for encoding a media bitstream that can be parsed by Pv1 and Pv2:

TABLE 9

1. Add feature X to an entry A
2. Add updated feature X2 to an entry B
3. Add entry A and entry B to an entry E
4. Write entry E to the media bitstream, including the added entries and features ExtendedRegionWisePackingBox In this section there is described an embodiment for providing backward compatibility that is specific for the OMAF specification.

In this embodiment a new box is added to the updated version of the OMAF specification (e.g. version 2). The box (referred to herein as an "ExtendedRegionWisePackingBox" (ERWP box) or "CompactRegionWisePackingBox" (CRWP box)), is an update of the region-wise packing (RWP) box in OMAF v1 with additional and/or modified syntax compared to the RWP box.

In order to be fully backwards compliant with an OMAF v1 player, a media bitstream may contain both an RWP box and an ERWP box. The RWP box should then contain a valid, but preferably simple representation of the media to be rendered. An example of a valid and simple representation is to only provide a viewport, i.e. a 2D video of one part of the 360° sphere. Another example is to provide the mapping for a cube map, but not divide each face into several tiles.

In the case where the media bitstream is received by an OMAF v1 player (referred to Pv1), Pv1 parses the RWP box but ignores the ERWP box, which is not understood by Pv1, and then uses the information in the RWP box for rendering. In the case wherein the media bitstream is received by an OMAF v2 player (referred to as Pv2), Pv2 parses the ERWP box but ignores the RWP box because the ERWP box is available, and then uses the information in the ERWP box for rendering. In a bitstream only containing an RWP box but no ERWP box, Pv2 would parse and use the information in the RWP box for rendering.

Figure 9:
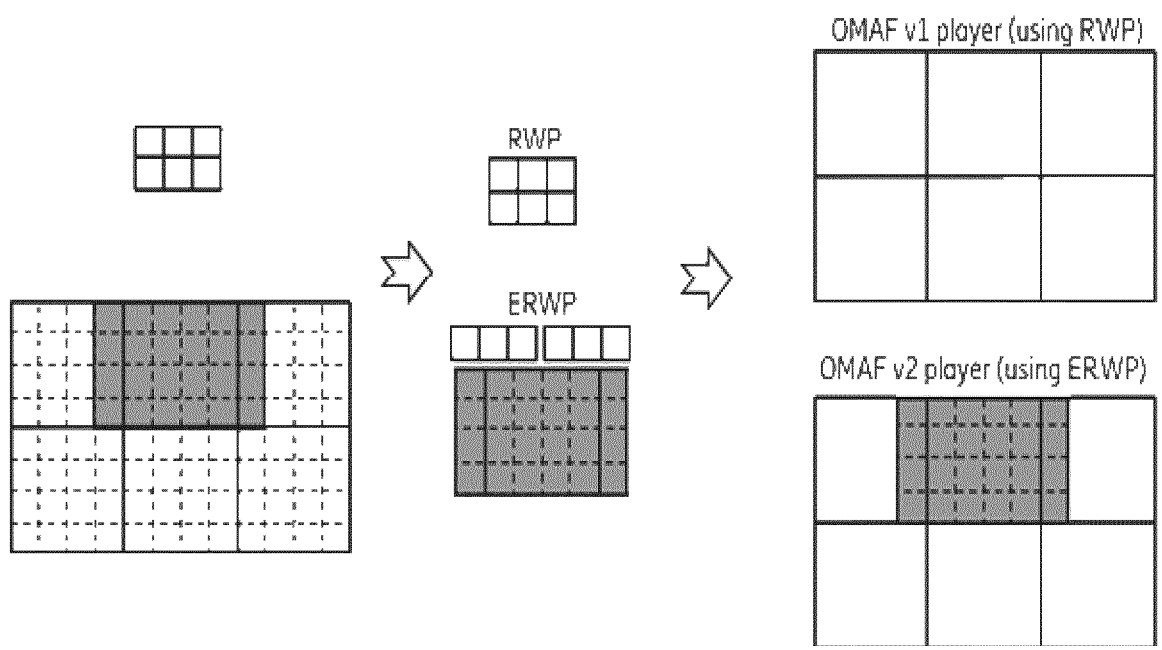
FIG. 9 illustrates a region-wise packing of a cube map with two resolutions using RWP and ERWP.

This is illustrated in the example in FIG. 9 where region-wise packing of a cube map has been made for two different resolutions. All cube faces for the low-resolution cube map has first been packed using RWP. In addition to the cube faces from the low-resolution cube map, a selected set of tiles from the high-resolution cube map, where each cube face has been divided into 16 tiles, are packed using ERWP, in a more compact way than is possible with RWP. If Pv1 receives the bitstream, then Pv1 discards the ERWP box and parses the RWP box with the low-resolution cube map. If Pv2 receives the bitstream, then Pv2 ignores the RWP box since the ERWP box is available and parses the ERWP box with both the full low-resolution cube map and the set of tiles from the high-resolution cube map.

Figure 10:
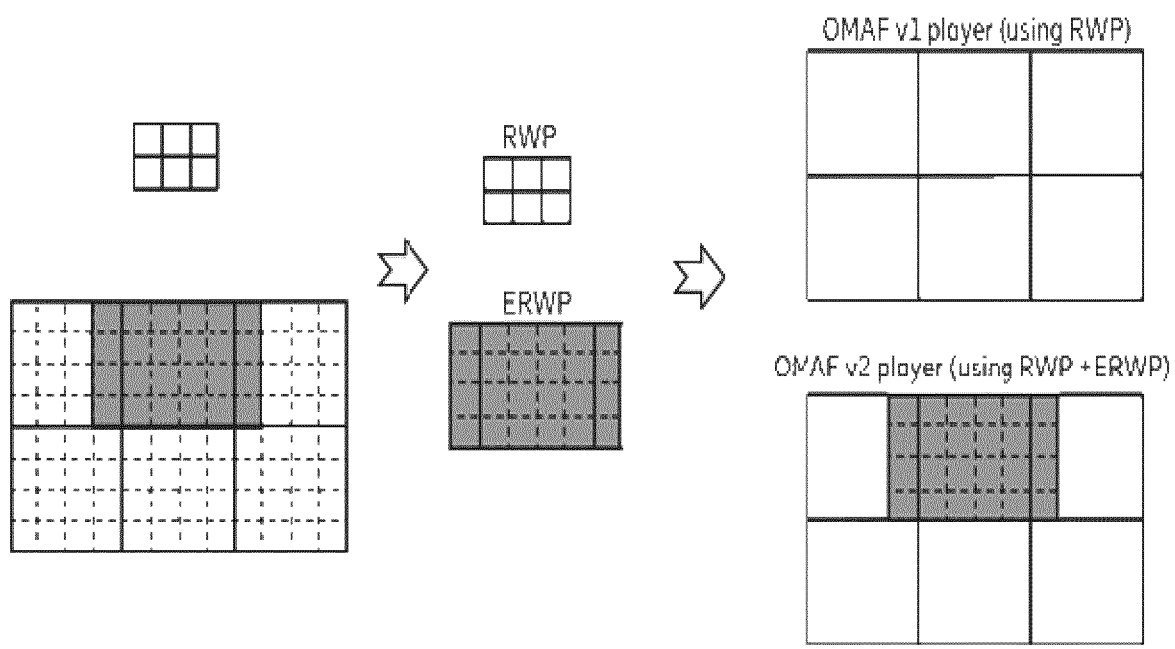
FIG. 10 illustrates alternative version of region-wise packing of cube map with two resolutions using RWP and ERWP.

In an alternative version, in case the media bitstream is received by Pv2, both the RWP box and the ERWP box are parsed and their combined information is used for rendering. For this to work, the ERWP box should be an extension to the RWP box such that the functionality in the ERWP box is compliant with the functionality in the RWP box. This is illustrated in FIG. 10, where the full low-resolution cube map is not included in the ERWP box. Pv2 parses both the RWP box and the ERWP box, to be able to unpack both the full low-resolution cube map and the selected tiles from the high-resolution cube map. This alternative version would save extra bits since the mapping for the low-resolution cube map only needs to be sent in the RWP box, but it adds complexity since both the RWP and ERWP boxes need to be parsed and combined.

In some embodiments, the RWP box is provided to the basic users while the ERWP box is also provided for premium users.

In addition to enabling a more compact way of describing the region-wise packing information, the ERWP box may support more regions than the RWP box. This may for instance be useful for 3DoF+ video where it is expected that several views need to be packed and transmitted. The ERWP box may also comprise additional features to support 3DoF+ video and 6DoF video. This may include specific support for depth maps, new ways of combining/packing several different views, new ways to pack geometric information and point cloud attributes, etc.

The below tables provide an example definition, syntax and semantics for the ExtendedRegionWisePackingBox and ExtendedRegionWisePackingProperty on top of OMAF v2 WD (w17827-v1). The maximum number of regions have been increased from 255 to $2^{16}-1$ to support more complex representations.

TABLE 10

Definition of ExtendedRegionWisePacking (EWRP) box
Box Type:      'erwp'
Container:     ProjectedOmniVideoBox

TABLE 10-continued

Mandatory: No
Quantity: Zero or one

ExtendedRegionWisePackingBox specifies like RegionWisePackingBox the mapping between packed regions and the corresponding projected regions and specifies the location and size of the guard bands, if any. In addition to RegionWisePackingBox, ExtendedRegionWisePackingBox supports more regions and provides means for a compact description of the region-wise packing information.

> NOTE: For backwards compatibility with OMAF v1, a RegionWisePackingBox should be present after the ExtendedRegionWisePackingBox in the ProjectedOmniVideoBox. The RegionWisePackingBox should include at least one valid mapping between the packed picture and the projected picture. An OMAF v2 player should discard the RegionWisePackingBox if the ExtendedRegionWisePackingBox is available.

Syntax
```
aligned(8) class ExtendedRegionWisePackingBox extends FullBox('erwp', 0, 0) {
    ExtendedRegionWisePackingStruct( );
}
```

TABLE 11

Definition of ExtendedRegionWisePackingProperty
Box type: 'erwp'
Property type: Descriptive item property
Container: ItemPropertyContainerBox
Mandatory (per an item): No
Quantity (per an item): Zero or one ExtendedRegionWisePackingProperty specifies like RegionWisePackingProperty the mapping between packed regions and the corresponding projected regions and specifies the location and size of the guard bands, if any. In addition to RegionWisePackingProperty, ExtendedRegionWisePackingProperty supports more regions and provides means for a compact description of the region-wise packing information.

> NOTE: For backwards compatibility with OMAF v1, a RegionWisePackingProperty should be present after the ExtendedRegionWisePackingProperty in the ItemPropertyContainerBox. The RegionWisePackingProperty should include at least one valid mapping between the packed picture and the projected picture. An OMAF v2 player should discard the RegionWisePackingProperty if the ExtendedRegionWisePackingProperty is available.

Syntax
```
aligned(8) class ExtendedRegionWisePackingProperty
extends ItemFullProperty('rwpk', 0, 0) {
    ExtendedRegionWisePackingStruct( );
}
```

TABLE 12

Syntax of the rectangular extended region packing structure
```
aligned(8) class RectExtendedRegionPacking(i, scale_factor_proj, scale_factor_packed,
proj_reg_equal_size_flag, packed_reg_equal_size_flag, proj_raster_scan_order_flag,
packed_raster_scan_order_flag)
{
    unsigned int(3) transform_type[i];
    bit(5) reserved = 0;
    if (scale_factor_proj)
        num_bytes_proj = 8
    else
        num_bytes_proj = 32
    if (scale_factor_packed)
        num_bytes_packed = 8
    else
        num_bytes_packed = 16
    if ( !(proj_reg_equal_size_flag && i > 0) ) {
        unsigned int(num_bytes_proj) ext_proj_reg_width[i];
        unsigned int(num_bytes_proj) ext_proj_reg_height[i];
    }
    if ( !proj_raster_scan_order_flag ) {
        unsigned int(num_bytes_proj) ext_proj_reg_top[i];
        unsigned int(num_bytes_proj) ext_proj_reg_left[i];
    }
    if ( !(packed_reg_equal_size_flag && i > 0) ) {
        unsigned int(num_bytes_packed) ext_packed_reg_width[i];
        unsigned int(num_bytes_packed) ext_packed_reg_height[i];
    }
```

TABLE 12-continued

```
    if ( !proj_raster_scan_order_flag ) {
        unsigned int(num_bytes_packed) ext_packed_reg_top[i];
        unsigned int(num_bytes_packed) ext_packed_reg_left[i];
    }
}
```

TABLE 13

Semantics of the rectangular extended region packing structure
    transform_type[i] is specified as in
    RectRegionPacking.
    num_bytes_proj, num_bytes_packed specify the number of bytes used for representing
        ext_proj_reg_width[i], ext_proj_reg_height[i], ext_proj_reg_top[i],
        ext_proj_reg_left[i],
        ext_packed_reg_width[i], ext_packed_reg_height[i], ext_packed_reg_top[i], and
        ext_packed_reg_left[i], respectively.
    ext_proj_reg_width[i], ext_proj_reg_height[i], ext_proj_reg_top[i], and ext_proj_reg_left[i]
        are specified as proj_reg_width[i], proj_reg_height[i], proj_reg_top[i], and
        proj_reg_left[i] except if scale_factor_proj > 0, then the following applies:
            ○  ext_proj_reg_width[i], ext_proj_reg_height[i], ext_proj_reg_top[i], and
                ext_proj_reg_left[i] multiplied by scale_factor_proj specify the scaled width,
                height, top offset, and left offset, respectively, of the i-th packed region.
    ext_packed_reg_width[i], ext_packed_reg_height[i], ext_packed_reg_top[i], and
        ext_packed_reg_left[i] are specified as packed_reg_width[i], packed_reg_height[i],
        packed_reg_top[i], and packed_reg_left[i] with the following exceptions:
            ○  if scale_factor_packed is set to a non-zero value then ext_packed_reg_width[i],
                ext_packed_reg_height[i], ext_packed_reg_top[i], and ext_packed_reg_left[i]
                multiplied by scale_factor_packed specify the scaled width, height, top offset, and
                left offset, respectively, of the i-th packed region.

TABLE 14

```
Syntax of the extended region-wise packing structure
aligned(8) class ExtendedRegionWisePackingStruct( ) {
    unsigned int(1) constituent_picture_matching_flag;
    unsigned int(1) scale_factor_flag
  unsigned int(1) proj_reg_equal_size_flag
    unsigned int(1) packed_reg_equal_size_flag
    unsigned int(1) proj_raster_scan_order_flag
    unsigned int(1) packed_raster_scan_order_flag
    bit(2) reserved = 0;
    if (scale_factor_flag) {
        unsigned int(16) scale_factor_proj;
        unsigned int(16) scale_factor_packed;
    }
    unsigned int(16) num_regions;
    unsigned int(32) proj_picture_width;
    unsigned int(32) proj_picture_height;
    unsigned int(16) packed_picture_width;
    unsigned int(16) packed_picture_height;
    for (i = 0; i < num_regions; i++) {
        bit(3) reserved = 0;
        unsigned int(1) guard_band_flag[i];
        unsigned int(4) packing_type[i];
        if (packing_type[i] == 0) {
            RectExtendedRegionPacking(i, scale_factor_proj,
                scale_factor_packed,
                proj_reg_equal_size_flag,
                packed_reg_equal_size_flag,
                proj_raster_scan_order_flag,
                packed_raster_scan_order_flag);
        if (guard_band_flag[i])
            GuardBand(i);
        }
    }
}
```

TABLE 15

Semantics of the extended region-wise packing structure
    constituent_picture_matching_flag is specified as in RegionWisePackingStruct.
    scale_factor_flag equal to 1 specifies that scale_factor_proj and scale_factor_packed are
        signaled. scale_factor_flag equal to 0 specifies that scale_factor_proj and
        scale_factor_packed are not signaled and inferred to be 0.
            NOTE 1:    Setting this flag equal to 1 together with setting at least one of
                            scale_factor_proj and scale_factor_packed to a non-zero value, allows
                            for compact signalling of region-wise packing information.
    proj_reg_equal_size_flag equal to 1 specifies that all regions of the projected picture have the
        same width and height. The regions in the left column of the picture may have a shorter
        width than regions in other columns and the regions at the bottom row of the picture may
        have a shorter height than regions in other rows. proj_reg_equal_size_flag equal to 0
        specifies that all regions of the projected picture may not have equal size.
            NOTE 2:    For projected regions where the regions have equal size, setting this flag
                            equal to 1 allows for more compact signalling of region-wise packing
                            information by only signalling the size for the first region.

TABLE 15-continued packed_reg_equal_size_flag equal to 1 specifies that all regions of the packed picture have
   the same width and height. The regions in the left column of the picture may have a
   shorter width than regions in other columns and the regions at the bottom row of the
   picture may have a shorter height than regions in other rows. packed_reg_equal_size_flag
   equal to 0 specifies that all regions of the packed picture may not have equal size.
      NOTE 3:   For packed regions where the regions have equal size, setting this flag
                equal to 1 allows for more compact signalling of region-wise packing
                information by only signalling the size for the first region.
proj_raster_scan_order_flag equal to 1 specifies that all regions of the projected picture are
   ordered in raster scan order. For stereoscopic frame packing formats, the regions are
   ordered in raster scan order for each stereo view. proj_reg_equal_size_flag equal to 0
   specifies that all regions of the projected picture may not be ordered in raster scan order.
      NOTE 4:   For projected regions where the regions are ordered in raster scan order,
                setting this flag equal to 1 allows for more compact signalling of
                region-wise packing information by deriving the region offsets from the
                region width and region height.
packed_raster_scan_order_flag equal to 1 specifies that all regions of the packed picture are
   ordered in raster scan order. For stereoscopic frame packing formats, the regions are
   ordered in raster scan order for each stereo view. packed_reg_equal_size_flag equal to 0
   specifies that all regions of the packed picture may not be ordered in raster scan order.
      NOTE 5:   For packed regions where the regions are ordered in raster scan order,
                setting this flag equal to 1 allows for more compact signalling of
                region-wise packing information by deriving the region offsets from the
                region width and region height.
scale_factor_proj specify the scale factor to be used to reconstruct the parameters for the
   projected regions. scale_factor_proj equal to 0 specifies that the values for the projected
   regions have not been scaled.
scale_factor_packed specify the scale factor to be used to reconstruct the parameters for the
   packed regions. scale_factor_packed equal to 0 specifies that the values for the packed
   regions have not been scaled.
num_regions is specified as in RegionWisePackingStruct.
proj_picture_width and proj_picture_height are specified as in RegionWisePackingStruct.
packed_picture_width and packed_picture_height are specified as in
   RegionWisePackingStruct.
guard_band_flag[i] is specified as in RegionWisePackingStruct.
packing_type[i] is specified as in RegionWisePackingStruct.
RectExtendedRegionPacking( ) specifies the extended version of region-wise packing
   between the i-th packed region and the i-th projected region.
GuardBand(i) is specified as in RegionWisePackingStruct.

Flag to Decide if RegionWisePackingBox and ExtendedRegionWisePackingBox should be Combined In yet another embodiment, a flag is used to determine if the set of region mappings derived from the RegionWisePackingBox should be combined with the set of region mappings derived from the ExtendedRegionWisePackingBox to form the full set of region mappings for the region-wise packing. For instance, if the region mappings in the RegionWisePackingBox are also present in the ExtendedRegionWisePackingBox, i.e. the region mappings are redundant, then the RegionWisePackingBox may safely be ignored and discarded and the full set of region mappings could be derived from the ExtendedRegionWisePackingBox. The flag could be put in the ExtendedRegionWisePackingStruct or directly in the ExtendedRegionWisePackingBox.

Below is an example of syntax and semantics for the ExtendedRegionWisePackingBox that is using a flag for indicating if the RegionWisePackingBox is redundant or not:

TABLE 16

Syntax aligned(8) class ExtendedRegionWisePackingBox
extends ItemFullBox('erwp', 0, 0) {
    unsigned int(1) rwp_redundant_flag
    bit(7) reserved = 0;
    ExtendedRegionWisePackingStruct( );
}

Semantics rwp_redundant_flag equal to 1 specifies that all region mappings defined in
RegionWisePackingBox are also present in the ExtendedRegionWisePackingStruct( ).
rwp_redundant_flag equal to 0 specifies that all region mappings defined in
RegionWisePackingBox are not present in the ExtendedRegionWisePackingStruct( ).

Below is an additional example of syntax and semantics for the ExtendedRegionWisePackingBox that is using a flag for indicating if the regions in RegionWisePackingBox should be combined with the regions in ExtendedRegionWisePackingBox or not:

TABLE 17

Syntax
```
aligned(8) class ExtendedRegionWisePackingBox
extends ItemFullBox('erwp', 0, 0) {
    unsigned int(1) combine_with_rwp_flag
    bit(7) reserved = 0;
    ExtendedRegionWisePackingStruct( );
}
```
Semantics
combine_with_rwp_flag equal to 1 specifies that the region mappings defined in RegionWisePackingBox should be combined with the regions in ExtendedRegionWisePackingStruct( ) to form the full set of region mappings.
combine_with_rwp_flag equal to 0 specifies that the region mappings defined in RegionWisePackingBox should not be combined with the regions in ExtendedRegionWisePackingStruct( ).

In another version, if a RegionWisePackingBox is present in the bitstream, then some of the parameters in the RegionWisePackingBox that are not compressed by the ExtendedRegionWisePackingBox may be derived from the RegionWisePackingBox instead of explicitly signaled in the ExtendedRegionWisePackingStruct. These parameters may include proj_picture_width, proj_picture_height, packed_picture_width, packed_picture_height, and guard band parameters. A flag may be used in the ExtendedRegionWisePackingStruct to determine if the parameters should be explicitly signaled or not.

Use Version Number in Existing OMAF v1 RegionWisePacking Box

In yet another embodiment, backwards compatibility is enabled by setting the version number of the RegionWisePackingBox with the updated functionality to a non-zero value, thereby providing an indication that the updated RegionWisePackingBox is not understood by OMAF players only supporting OMAF v1.

This is exemplified in the syntax below where the RegionWisePackingBox from OMAF v1 is updated in OMAF v2 with an additional value for the version parameter and changed syntax to provide a more compact description of the region-wise packing information as described in the background and above:

TABLE 18

```
aligned(8) class RegionWisePackingBox extends FullBox('rwpk', v, 0) {
    if( v==0 ) {
        RegionWisePackingStruct( );
    } else if (v == 1 ) {
        ExtendedRegionWisePackingStruct( );
    }
}
```

FullBox is defined in ISO/IEC 14996-12 (ISOBMFF) as:

TABLE 19

```
aligned(8) class FullBox(unsigned int(32) boxtype, unsigned int(8) v, bit(24) f) extends
Box(boxtype) {
    unsigned int(8)         version = v;
    bit(24)                 flags = f;
}
```

The semantics of these two fields are: version is an integer that specifies the version of this format of the box, and flags is a map of flags. Boxes with an unrecognized version shall be ignored and skipped.

With this solution, an OMAF v1 media player parsing the OMAF v2 bitstream then knows it cannot understand the updated RegionWisePackingBox when the version value is set to 1 and ignores and skips this box. Thus, there will be no issues where the OMAF v1 player tries to parse the extended features of the box and potentially crashes.

A down-side with this solution is that it only solves the parsing problem. If a valid region-wise packing is required to render a 360° video scene properly according to the OMAF v1 specification, the solution of this embodiment cannot provide that.

Use a New packing_type for RectExtendedRegionWisePacking in RegionWisePackingStruct In yet another embodiment, a new packing type is introduced in RegionWisePackingStruct. The new packing type is indicated with a non-zero value for packing_type, e.g. 1. When parsing RegionWisePackingStruct, if packing type equals 0, then RectRegionWisePacking is parsed. If instead packing_type equals 1, then the ExtendedRectRegionWisePacking from the previous embodiments is parsed. If this is combined with the version flag solution described above, this could be a way of expressing the ExtendedRectRegionWisePacking within the RegionWisePackingBox with the new version number.

Figure 11:
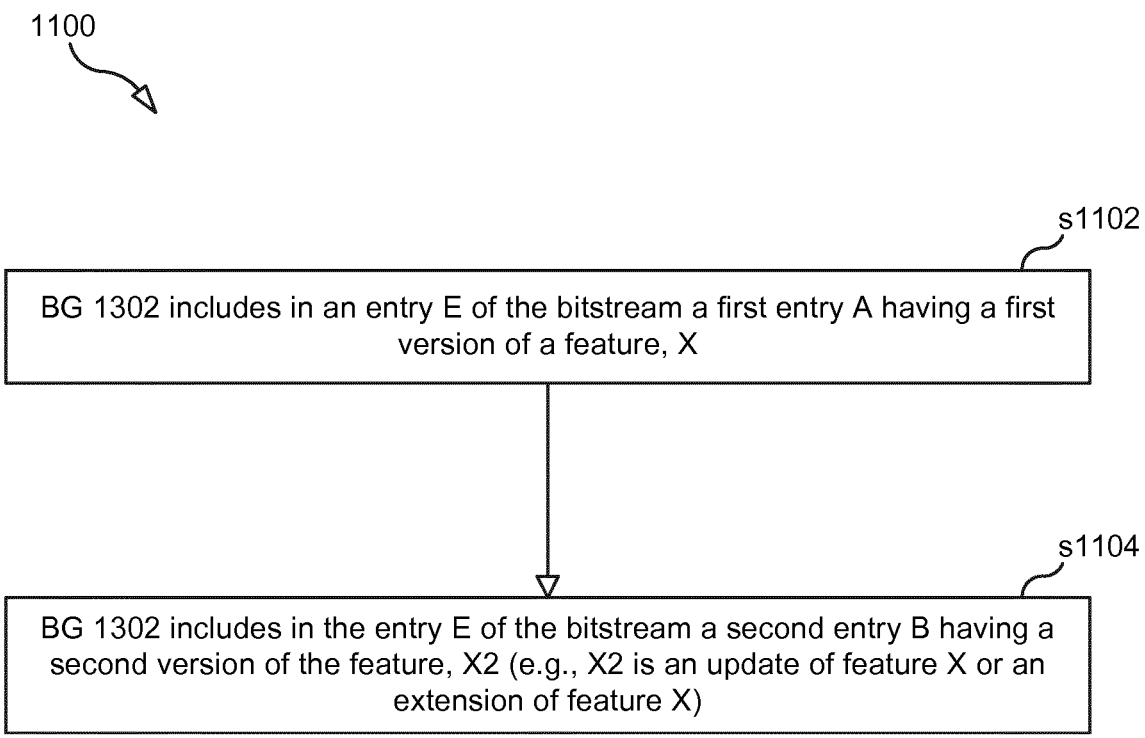
FIG. 11 is a flow chart illustrating a process according to one embodiment.

FIG. 11 is a flow chart illustrating a process 1100, according to an embodiment, that is performed by a bitstream generator (BG) 1302 (see FIG. 13) for generating a bitstream. Process 1100 may begin in step s1102.

In step s1102, BG 1302 includes in an entry E of the bitstream a first entry A having a first version of a feature, X defined by a first version of a media bitstream syntax specification S1.

In steps s1104, BG 1302 includes in the entry E of the bitstream a second entry B having a second version of the feature, X2 defined by an updated version, S2, of the media bitstream syntax specification S1. In one embodiment, feature X2 is an update of feature X. In another embodiment, feature X2 is an extension of feature X.

In some embodiments, feature X2 includes means to compress the representation of the realization of the feature compared to feature X. In some embodiments, the bitstream conforms to a syntax specification and the syntax specification is a version of OMAF.

In some embodiments, feature X is region-wise packing and feature X2 is an extended version of the region-wise packing. In some embodiments, feature X is region-wise packing and feature X2 is an updated version of the region-wise packing.

In some embodiments, the entry E contains an indication whether feature X2 is an update to feature X and entry A should be discarded according to embodiment 2 or whether feature X2 is an extension of feature X and should be parsed according to embodiment 3 and combined with feature X2

In some embodiments, entry A and entry B have the same entry type, entry A contains a version indicator indicating a first version, entry B contains a version indicator indicating a second version, and the second version is higher than the first version.

Figure 12:
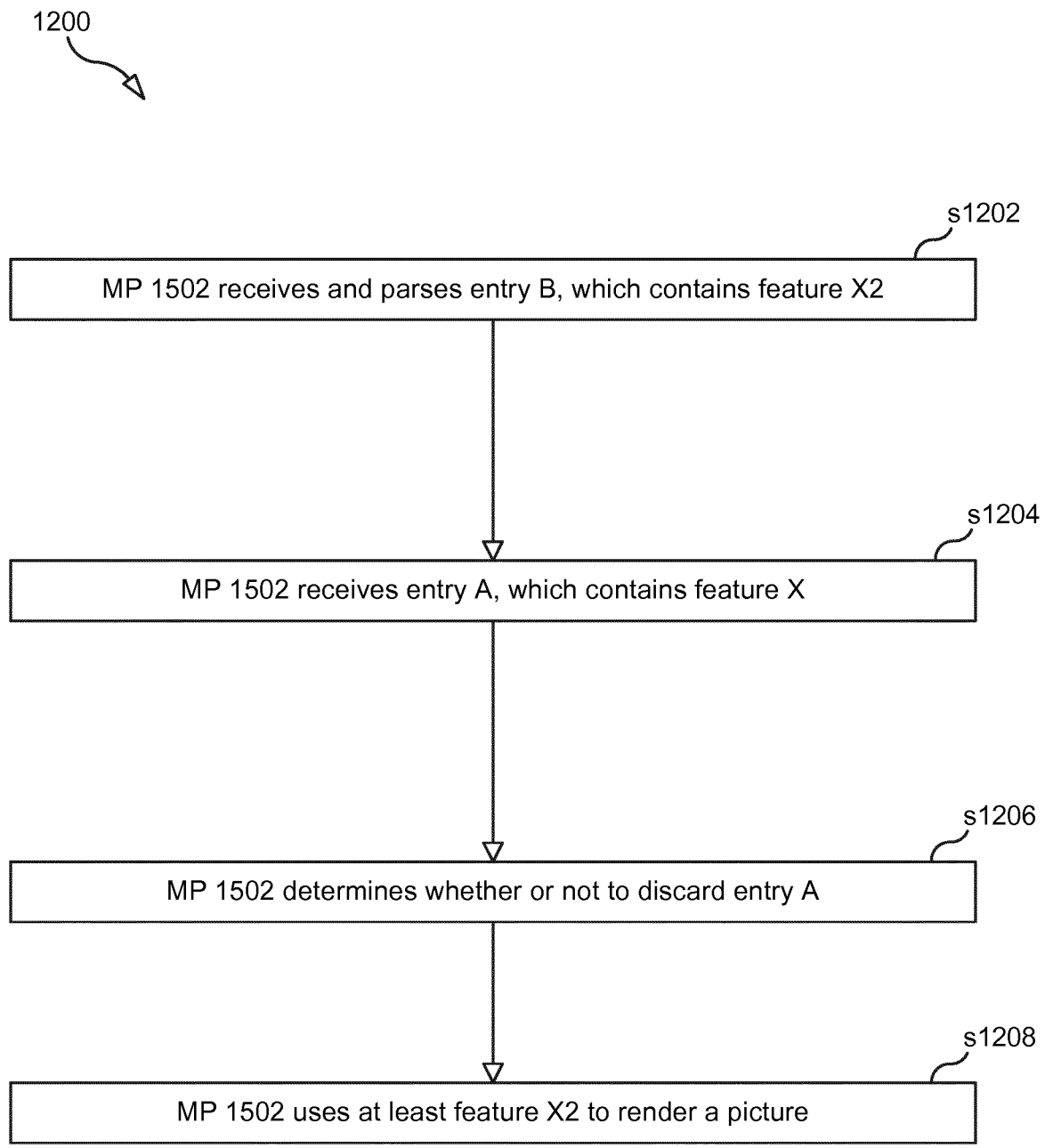
FIG. 12 is a flow chart illustrating a process according to one embodiment.

FIG. 12 is a flow chart illustrating a process 1200, according to an embodiment, that is performed by a media player (MP) 1502 (see FIG. 15) for processing (e.g., decoding and/or rendering) media (e.g., pictures and/or audio) encoded in the bitstream generated by BG 1302. Process 1200 may begin in step s1202. In step s1202, MP 1502 receives and parses entry B, which contains feature X2. In step s1204, MP 1502 receives entry A, which contains feature X. In step s1206, MP 1502 determines whether or not to discard entry A. In step s1208, MP 1502 uses at least feature X2 to process a picture.

In some embodiments, determining whether or not to discard entry A comprises MP 1502 determining whether feature X2 is an update of feature X or an extension of feature X.

In some embodiments, MP 1502 discards entry A as a result of determining that feature X2 is an update of feature X. In some embodiments, entry B includes information indicating that feature X2 is an update of feature X.

In some embodiments, process 1200 further includes parsing entry A; and using feature X and feature X2 to process a picture as a result of determining that feature X2 is an extension of feature X. In some embodiments, entry B includes information indicating that feature X2 is an extension of feature X.

In some embodiments, the second entry B is contained in a container of the bitstream, and the media player discards the first entry A as a result of determining that the first entry A is also contained in the container. In some embodiments, the container is a ProjectedOmniVideoBox.

Figure 13:
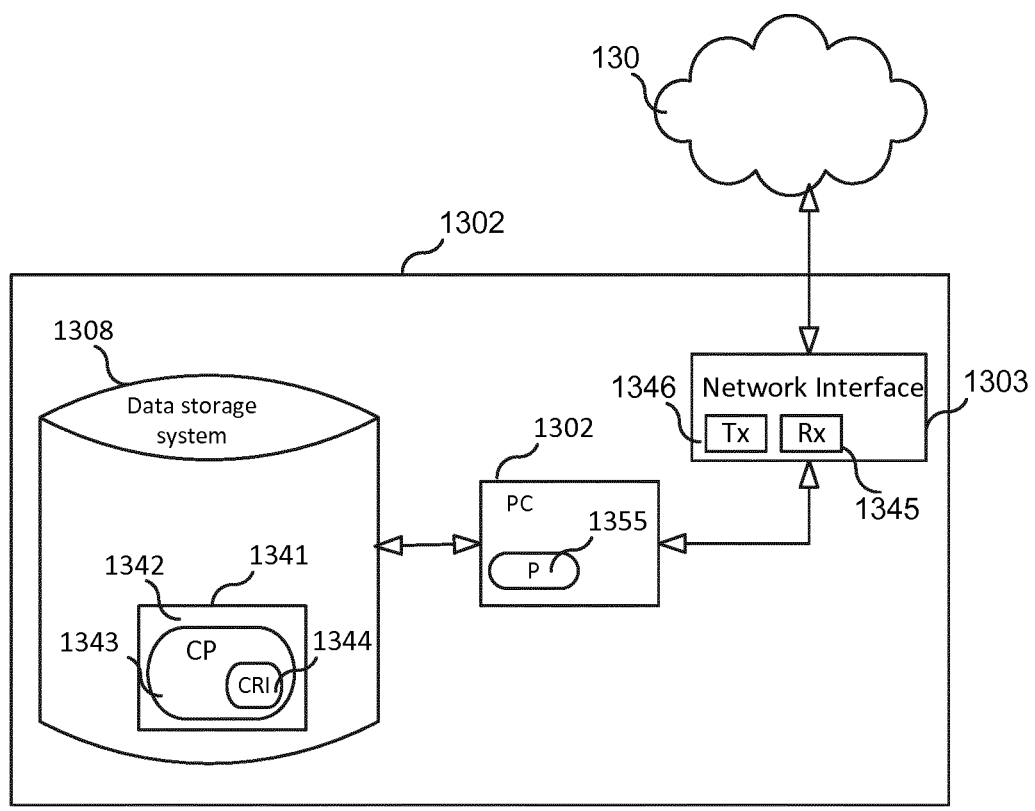
FIG. 13 is a block diagram of a bitstream generator (BG) according to one embodiment.

FIG. 13 is a block diagram of bitstream generator (BG) 1302, according to some embodiments for performing methods disclosed herein. As shown in FIG. 13, BG 1302 may comprise: processing circuitry (PC) 1302, which may include one or more processors (P) 1355 (e.g., a general purpose microprocessor and/or one or more other processors, such as an application specific integrated circuit (ASIC), field-programmable gate arrays (FPGAs), and the like), which processors may be co-located or distributed in different locations; a network interface 1303 (e.g., transceiver circuitry comprising a receiver (Rx) 1345 and a transmitter (Tx) 1346) connected (directly or indirectly) to a network 130 (e.g., the Internet); and a local storage unit (a.k.a., "data storage system") 1308, which may include one or more non-volatile storage devices and/or one or more volatile storage devices. In embodiments where PC 1302 includes a programmable processor, a computer program product (CPP) 1341 may be provided. CPP 1341 includes a computer readable medium (CRM) 1342 storing a computer program (CP) 1343 comprising computer readable instructions (CRI) 1344. CRM 1342 may be a non-transitory computer readable medium, such as, magnetic media (e.g., a hard disk), optical media, memory devices (e.g., random access memory, flash memory), and the like. In some embodiments, the CRI 1344 of computer program 1343 is configured such that when executed by PC 1302, the CRI causes BG 1302 to perform steps described herein (e.g., steps described herein with reference to the flow charts). In other embodiments, BG 1302 may be configured to perform steps described herein without the need for code. That is, for example, PC 1302 may consist merely of one or more ASICs. Hence, the features of the embodiments described herein may be implemented in hardware and/or software.

Figure 14:
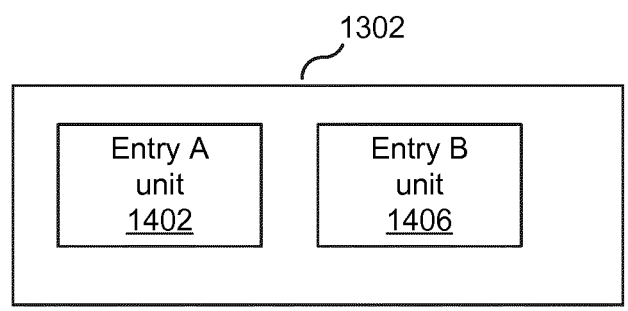
FIG. 14 is a diagram showing functional units of a BG according to one embodiment.

FIG. 14 is a diagram showing functional units of BG 1302 according to an embodiment. As shown in FIG. 14, BG 1302 includes: an entry A unit 1402 configured to include in an entry E in a bitstream an entry A, which contains feature X, which is defined by the first version of a media bitstream syntax specification 51; and an entry B unit 1404 configured to include in the entry E of the bitstream an entry B, which contains feature X2, which is defined by an updated version, S2, of the media bitstream syntax specification 51.

Figure 15:
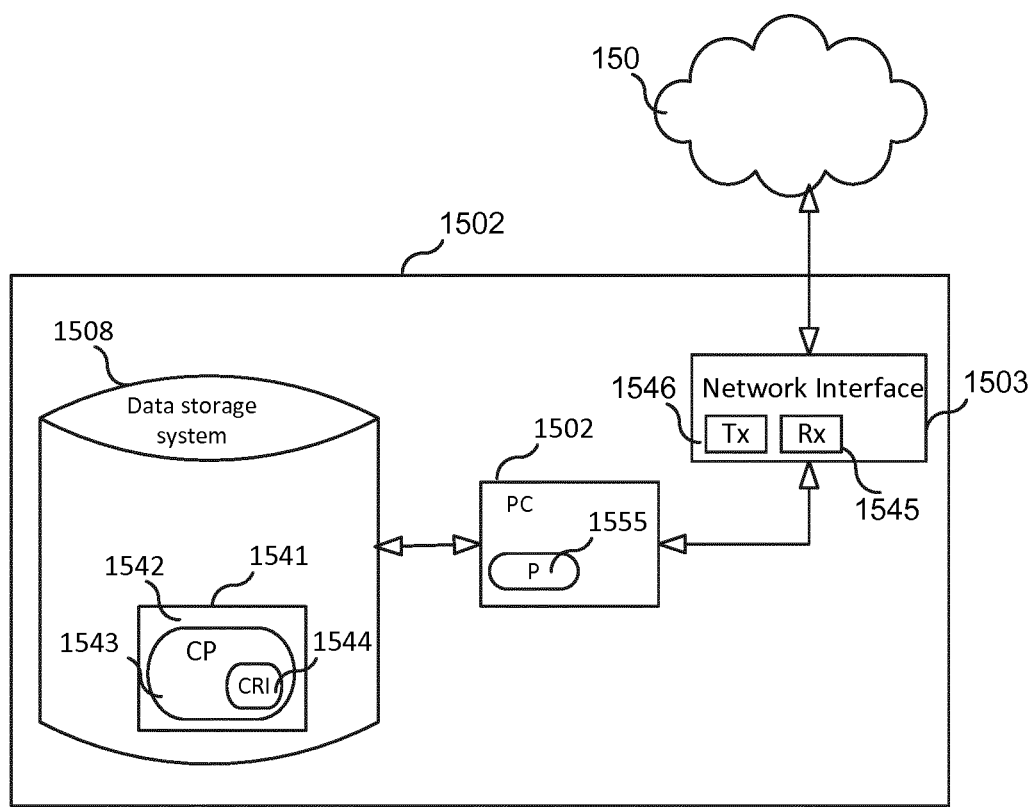
FIG. 15 is a block diagram of a media player (MP) according to one embodiment.

FIG. 15 is a block diagram of media player (MP) 1502, according to some embodiments for performing methods disclosed herein. As shown in FIG. 15, MP 1502 may comprise: processing circuitry (PC) 1502, which may include one or more processors (P) 1555 (e.g., a general purpose microprocessor and/or one or more other processors, such as an application specific integrated circuit (ASIC), field-programmable gate arrays (FPGAs), and the like), which processors may be co-located or distributed in different locations; a network interface 1503 (e.g., transceiver circuitry comprising a receiver (Rx) 1545 and a transmitter (Tx) 1546) connected (directly or indirectly) to a network 150 (e.g., the Internet); and a local storage unit (a.k.a., "data storage system") 1508, which may include one or more non-volatile storage devices and/or one or more volatile storage devices. In embodiments where PC 1502 includes a programmable processor, a computer program product (CPP) 1541 may be provided. CPP 1541 includes a computer readable medium (CRM) 1542 storing a computer program (CP) 1543 comprising computer readable instructions (CRI) 1544. CRM 1542 may be a non-transitory computer readable medium, such as, magnetic media (e.g., a hard disk), optical media, memory devices (e.g., random access memory, flash memory), and the like. In some embodiments, the CRI 1544 of computer program 1543 is configured such that when executed by PC 1502, the CRI causes MP 1502 to perform steps described herein (e.g., steps described herein with reference to the flow charts). In other embodiments, MP 1502 may be configured to perform steps described herein without the need for code. That is, for example, PC 1502 may consist merely of one or more ASICs. Hence, the features of the embodiments described herein may be implemented in hardware and/or software.

Figure 16:
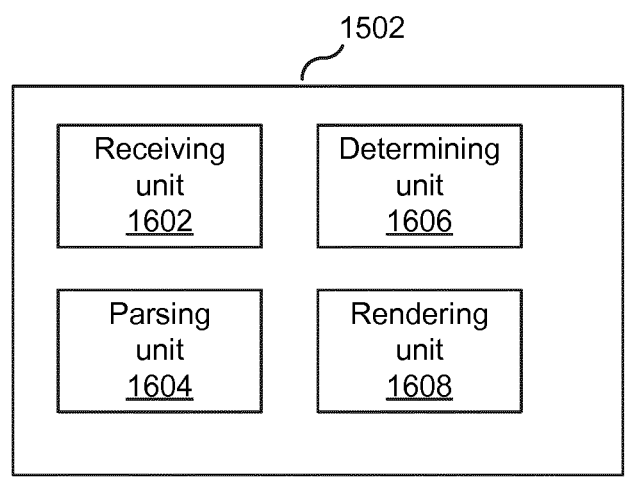
FIG. 16 is a diagram showing functional units of an MP according to one embodiment.

FIG. 16 is a diagram showing functional units of MP 1502 according to an embodiment. As shown in FIG. 16, MP 1502 includes: a receiving unit 1602 for receiving an entry B included in an entry E of a bitstream, wherein the bitstream also includes an entry A containing feature X and the entry B includes a feature X2 that is an update or extension of feature X; a parsing unit 1604 configured to parse entry B; a determining unit 1606 configured to determine whether or not to discard entry A.

Figure 17:
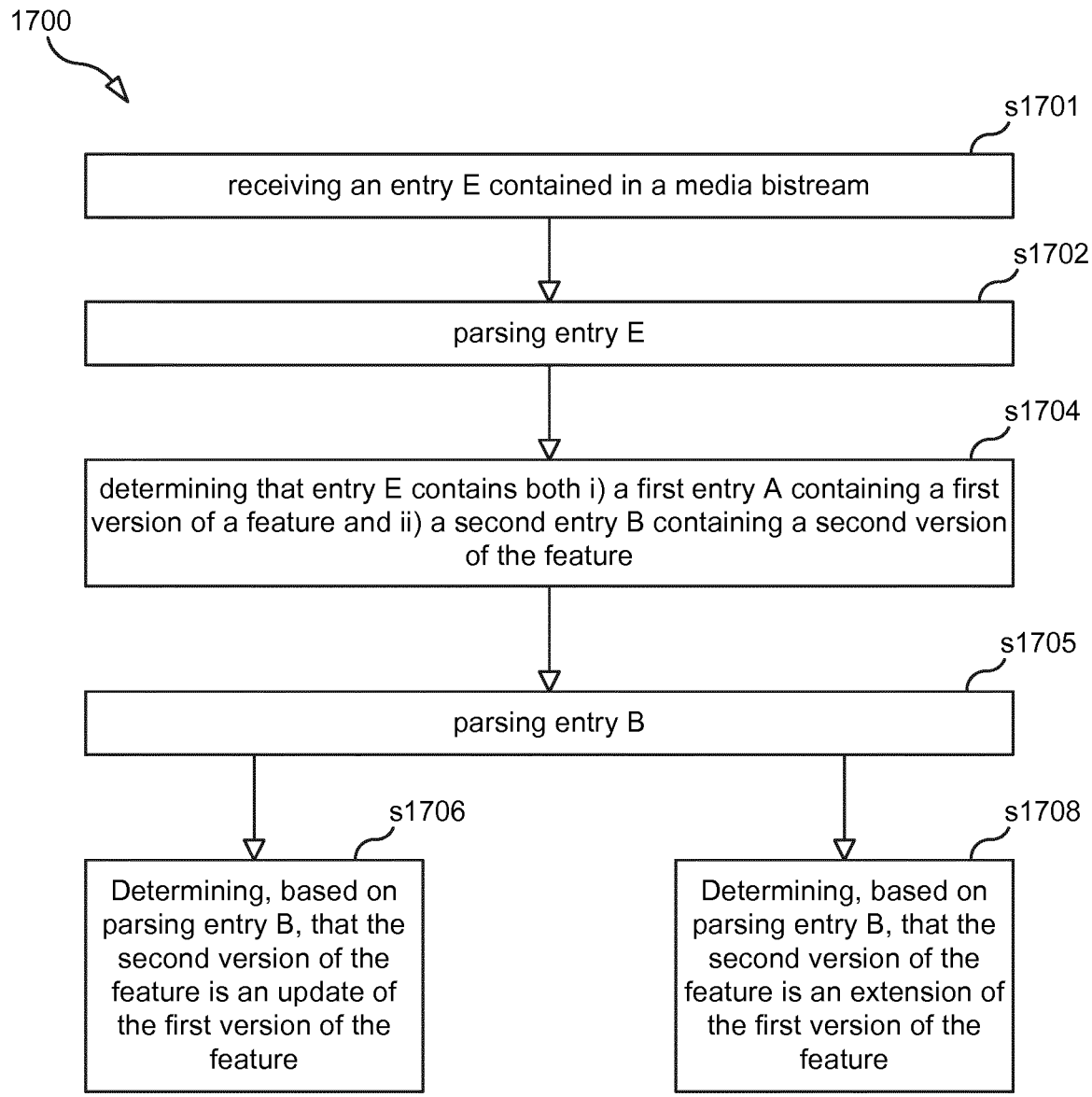
FIG. 17 is a flow chart illustrating a process according to one embodiment.

FIG. 17 is a flow chart illustrating a process 1700, according to an embodiment, that is performed by a media player 1502. Process 1700 may begin in step s1701. Step s1701 comprises receiving an entry, entry E, contained in a media bitstream. Step s1702 comprises parsing entry E. Step s1704 comprises, as a result of parsing entry E, determining that entry E contains both i) a first entry, entry A, containing a first version of a feature conforming to a first version of the media bitstream syntax specification and ii) a second entry, entry B, containing a second version of the feature conforming to the updated version of the media bitstream syntax specification. Step s1705 comprises parsing entry B. After step s1705 is performed then either step s1706 or step s1708 is performed. Step s1706 comprises determining, based on parsing entry B, that the second version of the feature is an update of the first version of the feature. Step s1708 comprises determining, based on parsing entry B, that the second version of the feature is an extension of the first version of the feature.

Figure 18:
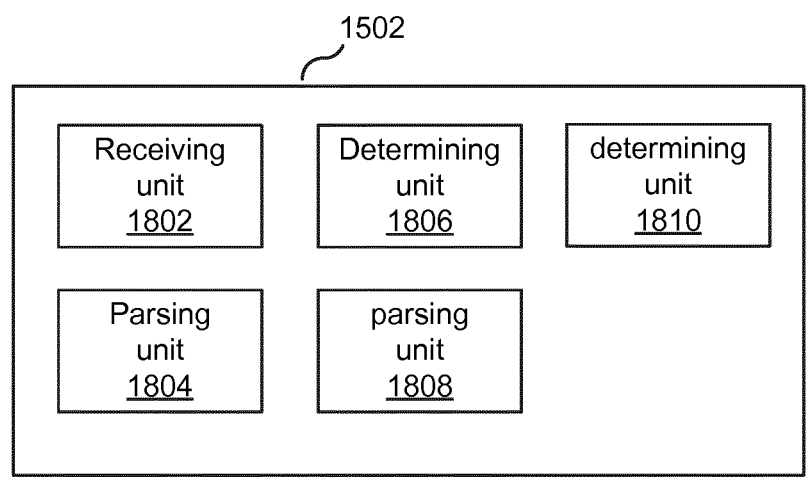
FIG. 18 is a diagram showing functional units of an MP according to one embodiment.

FIG. 18 is a diagram showing functional units of MP 1502 according to an embodiment. As shown in FIG. 18, MP 1502 includes: a receiving unit 1802 adapted to receive an entry, entry E, contained in a media bitstream; a first parsing unit 1804 adapted to parse entry E; a first determining unit 1806 adapted to determine whether entry E contains both i) a first entry, entry A, containing a first version of a feature conforming to a first version of the media bitstream syntax specification and ii) a second entry, entry B, containing a second version of the feature conforming to the updated version of the media bitstream syntax specification; a second parsing unit 1808 parse entry B; and a second determining unit 1810 adapted to, based on parsing entry B, determine whether a) the second version of the feature is an update of the first version of the feature or b) the second version of the feature is an extension of the first version of the feature.

Concise Description of Some of the Embodiments

A1. A method of generating a backwards compatible bitstream, the method comprising: including in an entry E of the bitstream a first entry A having a first version of a feature, X defined by a first version of a media bitstream syntax specification S1; and including in entry E of the bitstream a second entry B having a second version of the feature, X2 defined by an updated version, S2, of the media bitstream syntax specification.

A2. The method of embodiment A1, wherein feature X2 includes means to compress the representation of the realization of the feature compared to feature X.

A3. The method of any one of embodiments A1-A2, wherein entry A is a region-wise packing box.

A4. The method of any one of embodiments A1-A3, wherein the bitstream conforms to a syntax specification and the syntax specification is a version of OMAF.

A5. The method of any one of embodiments A1-A4, where feature X is region-wise packing and feature X2 is an extended version of the region-wise packing.

A6. The method of any one of embodiments A1-A4, where feature X is region-wise packing and feature X2 is an updated version of the region-wise packing.

A7. The method of any one of embodiments A1-A6, where the entry E contains an indication whether feature X2 is an update to feature X and entry A should be discarded according to embodiment 2 or whether feature X2 is an extension of feature X and should be parsed according to embodiment 3 and combined with feature X2

A8. The method of any one of embodiments A1-A7, wherein entry A and entry B have the same entry type, entry A contains a version indicator indicating a first version, entry B contains a version indicator indicating a second version, and the second version is higher than the first version.

B1. A method performed by a media player, the method comprising: the media player receiving the backwards compatible bitstream of any one of embodiments A1-A8.

B2. The method of embodiment B1, wherein receiving the backwards compatible bitstream comprises: receiving entry B; parsing entry B; receiving entry A; determining whether or not to discard entry A; and using at least feature X2 to process (e.g., render and/or decode) a picture.

B3. The method of embodiment B2, wherein determining whether or not to discard the first entry A comprises determining whether feature X2 is an update of feature X or an extension of feature X (e.g., this determination can be based on a version number included in entry B and/or entry A).

B4. The method of embodiment B3, further comprising: the player discarding the first entry A as a result of determining that feature X2 is an update of feature X.

B5. The method of embodiment B4, wherein the second entry B includes information indicating that feature X2 is an update of feature X.

B6. The method of embodiment B3, further comprising: parsing the first entry A; and using feature X and feature X2 to process a picture as a result of determining that feature X2 is an extension of feature X.

B7. The method of embodiment B6, wherein the second entry B includes information indicating that feature X2 is an extension of feature X.

B8. The method of embodiment B2, wherein the second entry B is contained in a container of the bitstream, and the media player discards the first entry A as a result of determining that the first entry A is also contained in the container.

B9. The method of embodiment B8, wherein the container is a ProjectedOmniVideoBox.

C1. A method for parsing and processing (e.g., rendering and/or decoding) a media bitstream according to an updated version of a media bitstream syntax specification S2 where the updated version of the bitstream syntax S2, specifies an entry E, which may contain none, any, or both of a first entry A containing a first feature X conforming to a first version of the media bitstream syntax specification S, and a second entry B containing a second feature X2 conforming to the updated version of the media bitstream syntax specification S2, the method comprising: —When parsing entry E, determine if entry A and not entry B is contained in entry E, and if so parse feature X in entry A—When parsing entry E, determine if entry B and not entry A is contained in entry E, and if so parse feature X2 in entry B—When parsing entry E, determine if both entry A and entry B is contained in entry E, and if so parse feature X2 in entry B—If either of entry A or entry B is contained in entry E, process the media bitstream using the parsed feature.

C2. The method of embodiment C1, where when parsing entry E and determining that both entry A and entry B is contained in entry E, discard entry A and parse feature X2 in entry B, if feature X2 is an update of feature X.

C3. The method of embodiment C1, where when parsing entry E and determining that both entry A and entry B is contained in entry E, parse both feature X in entry A and feature X2 in entry B, if feature X2 is an extension of feature X.

C4. The method of any one of embodiments C1-C3, where feature X2 includes means to compress the representation of the realization of the feature compared to feature X.

Specific OMAF Case

C5. The method of any one of embodiments C1-C4, where the media bitstream is an audio and/or video bitstream.

C6. The method of any one of embodiments C1-05, where an entry is a pointer, struct, container, box, property or atom.

C7. The method of any one of embodiments C1-C6, where the media bitstream syntax specification S is a first version of OMAF and the media bitstream syntax specification S2 is an updated version of OMAF.

C8. The method of any one of embodiments C1-C7, where feature X is region-wise packing and feature X2 is an extended version of the region-wise packing.

C9. The method of any one of embodiments C1-C7, where feature X is region-wise packing and feature X2 is an updated version of the region-wise packing.

C10. The method of any one of embodiments C1-C9, where the entry E contains an indication whether feature X2 is an update to feature X and entry A should be discarded or whether feature X2 is an extension of feature X and should be combined with feature X2

C11. The method of any one of embodiments C1-C10, where entry A and entry B have the same entry type, but entry B contains a version indicator that is higher than the version indicator of entry B.

While various embodiments are described herein (including any appendix), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The following description is from the Appendix to the U.S. Provisional patent application to which this application claims priority. The Appendix included relevant text of a contribution to the International Organization for Standardization (ISO).

1. Abstract

This is a follow-up contribution to m43436 proposed at the MPEG meeting in Ljubljana. It was commented at the meeting that m43436, which introduced a compact description of the region-wise packing information, has a backwards compatibility issue. In this contribution a solution is proposed to resolve the backwards compatibility issue.

It is proposed to add a new box, ExtendedRegionWisePackingBox, to the OMAF v2 specification. When full backwards compatibility with OMAF v1 is desired, it is recommended to send both a RegionWisePackingBox and an ExtendedRegionWisePackingBox in the bitstream. The same solution is proposed for the RegionWisePackingProperty.

Text for the proposed changes is included in this contribution. It is proposed to add the text to the next revision of OMAF v2 working draft (WD).

2. Introduction

The OMAF $2^{nd}$ edition WD includes text for region-wise packing. The region-wise packing structure contains information of how to unpack and project each region in a packed picture onto a projected picture.

In m43436 a compact description of the region-wise packing information was proposed. The solution in m43436 contained three methods for compressing the region-wise packing information:

(1) Scale factor—A scale factor and scaled values are signaled with reduced number of bits for the width, height, top and left offsets for projected and packed regions in the rectangular region packing structure. A flag is used to indicate if scaling is to be used.

(2) Copy size—The region width and height are signaled only for the first region if all regions have the same size. A flag is used for each of the projected and packed picture to indicate whether all regions have the same size.

(3) Raster scan order—Do not signal the top and left offsets of the regions if all regions are ordered in raster scan order. The offsets can be reconstructed on the receiver side using the picture width and the widths and heights of the regions. A flag is used for each of the projected and packed picture to indicate whether all regions are ordered in raster scan order.

The methods can be applied independently of each other or be combined for maximum compression.

At the Ljubljana meeting it was agreed to include the proposal into the OMAF Technologies under Consideration (TuC), with the editorial note "It is noted that the syntax below may not be backwards compatible".

It was commented that some aspects of the syntax have a backward compatibility issue: an OMAFv1 client would not be able to handle the content with the proposed updated RWP signaling with new parameters.

3. Proposal

This contribution proposes to resolve the backwards compatibility issue identified at the Ljubljana meeting by introducing a new box and a new entry in the OMAF v2 specification, the ExtendedRegionWisePackingBox and the ExtendedRegionWisePackingProperty. The new box and entry both contain the new ExtendedRegionWisePackingStruct, which includes the functionality for the compact description of the region-wise packing described in the OMAF TuC.

The text for the ExtendedRegionWisePackingBox contains the following note (a similar note is added to the ExtendedRegionWisePackingProperty text): "For backwards compatibility with OMAF v1, a RegionWisePackingBox should be present after the ExtendedRegionWisePackingBox in the ProjectedOmniVideoBox. The RegionWisePackingBox should include at least one valid mapping between the packed picture and the projected picture. An OMAF v2 player should discard the RegionWisePackingBox if the ExtendedRegionWisePackingBox is available."

Thus, a bitstream containing both a RegionWisePackingBox and an ExtendedRegionWisePackingBox could be handled by both an OMAF v1 player and an OMAF v2 player. The OMAFv1 player discards the ExtendedRegionWisePackingBox since it is unknown to the player and parses the RegionWisePackingBox and uses this information to render the content. The OMAF v2 player parses the ExtendedRegionWisePackingBox and uses this information to render the content.

To keep the bitrate down, it is preferred that the RegionWisePackingBox provides a simplified but valid mapping between the packed picture and the projected picture.

4. Proposed Text Changes

It is proposed to add the text contained in the table below to the next revision of the OMAF v2 WD.

---

7.6.5 Extended region-wise packing box
7.6.5.1 Definition
Box Type: 'erwp'
Container: ProjectedOmniVideoBox
Mandatory: No
Quantity: Zero or one
ExtendedRegionWisePackingBox specifies like RegionWisePackingBox the mapping between packed regions and the corresponding projected regions and specifies the location and size of the
guard bands, if any. In addition to RegionWisePackingBox, ExtendedRegionWisePackingBox supports more regions and provides means for a compact description of the region-wise packing
information.
NOTE: For backwards compatibility
with OMAF v1, a
RegionWisePackingBox should
be present after the
ExtendedRegionWisePackingBox
in the ProjectedOmniVideoBox.
The RegionWisePackingBox
should include at least
one valid mapping between the
packed picture and the projected
picture. An OMAF v2 player
should discard the
RegionWisePackingBox if the
ExtendedRegionWisePackingBox
is available.
7.6.5.2 Syntax
aligned(8) class ExtendedRegionWisePackingBox extendsFullBox('erwp', 0, 0) {
   ExtendedRegionWisePackingStruct( );
}
7.6.5.3 Semantics
Clause 0 applies with the following additional constraint:
- packed_picture_width and packed_picture_height shall have such values that packed_picture_width is an integer multiple of width and packed_picture_height is an integer multiple of height, where width and height are syntax elements of the VisualSampleEntry containing this box.
7.10.7 Extended region-wise packing item property
7.10.7.1 Definition
Box type: 'erwp'
Property type: Descriptive item property
Container: ItemPropertyContainerBox
Mandatory (per an item): No
Quantity (per an item): Zero or one
ExtendedRegionWisePackingProperty specifies like RegionWisePackingProperty the mapping between packed regions and the corresponding projected regions and specifies the location and size of the guard bands, if any. In addition to RegionWisePackingProperty, ExtendedRegionWisePackingProperty supports more regions and provides means for a compact
description of the region-wise packing information.
NOTE: For backwards compatibility
with OMAF v1, a
RegionWisePackingProperty
should be present after the
ExtendedRegionWisePackingProperty
in the ItemPropertyContainerBox.
The RegionWisePackingProperty
should include at least one
valid mapping between
the packed picture and the
projected picture.
An OMAF v2 player
should discard the
RegionWisePackingProperty if the
ExtendedRegionWisePackingProperty
is available.
7.10.7.2 Syntax
aligned(8) class ExtendedRegionWisePackingProperty
extends ItemFullProperty('rwpk', 0, 0) {
   ExtendedRegionWisePackingStruct( ); /* specified in clause 7.5.4 */
}
7.10.7.3 Semantics
Clause 0 applies with the following additional constraint:
 packed_picture_width and packed_picture_height shall have such values that
 packed_picture_width is an integer multiple of image_width and
 packed_picture_height is an integer multiple of image_height, where image_width -continued and image_height are syntax elements of the ImageSpatialExtentsProperty associated to the image item.

7.5.4 Extended region-wise packing structure
ExtendedRegionWisePackingStruct specifies like RegionWisePackingStruct the mapping between packed regions and the corresponding projected regions and specifies the location and size of the guard bands, if any. In addition to RegionWisePackingStruct, ExtendedRegionWisePackingStruct supports more regions and provides means for a compact description of the region-wise packing information.
The content of ExtendedRegionWisePackingStruct on top of RegionWisePackingStruct is informatively summarized below, while the normative semantics followsubsequently in this clause:
  When the size and offsets for the projected regions are scalable with an integer number, the scale_factor_flag equal to 1 in combination withscale_factor_proj, enables a compact description of the width, height, top and left offsets of the projected regions.
  When the size and offsets for the packed regions are scalable with aninteger number, the scale_factor_flag equal to 1 in combination with scale_factor_packed, enables a compact description of the width, height, top and left offsets of the packed regions.
  When the projected regions have equal size, the flag proj_reg_equal_size_flag equal to 1 enables a compact description of the width and height of the projected regions.
  When the packed regions have equal size the flag packed_reg_equal_size_flag equal to 1 enables a compact description of the width and height of the packed regions.
  When the projected regions are ordered in raster scan order, the flag proj_raster_scan_order_flag equal to 1 enables a compact description of the top and left offsets of the projected regions.
  When the packed regions are ordered in raster scan order, the flag packed_raster_scan_order_flag equal to 1 enables a compact description of the top and left offsets of the packed regions.

7.5.4.1 Syntax of the rectangular extended region packing structure

```
aligned(8) class RectExtendedRegionPacking(i, scale_factor_proj,
        scale_factor_packed,
        proj_reg_equal_size_flag,
        packed_reg_equal_size_flag,
        proj_raster_scan_order_flag,
        packed_raster_scan_order_flag) {
  unsigned int(3) transform_type[i];
  bit(5) reserved = 0;
  if (scale_factor_proj)
    num_bytes_proj = 8
  else
    num_bytes_proj = 32
  if (scale_factor_packed)
    num_bytes_packed = 8
  else
    num_bytes_packed = 16
  if ( !(proj_reg_equal_size_flag && i > 0) ) {
    unsigned int(num_bytes_proj) ext_proj_reg_width[i];
    unsigned int(num_bytes_proj) ext_proj_reg_height[i];
  }
  if ( !proj_raster_scan_order_flag ) {
    unsigned int(num_bytes_proj) ext_proj_reg_top[i];
    unsigned int(num_bytes_proj) ext_proj_reg_left[i];
  }
  if ( !(packed_reg_equal_size_flag && i > 0) ){
    unsigned int(num_bytes_packed) ext_packed_reg_width[i];
    unsigned int(num_bytes_packed) ext_packed_reg_height[i];
  }
  if ( !proj_raster_scan_order_flag ) {
    unsigned int(num_bytes_packed) ext_packed_reg_top[i];
    unsigned int(num_bytes_packed) ext_packed_reg_left[i];
  }
}
```

7.5.4.2 Semantics of the rectangular extended region packing structure
transform_type[i] is specified as in 0.
num_bytes_proj, num_bytes_packed specify the number of bytes used for representing
  ext_proj_reg_width[i], ext_proj_reg_height[i], ext_proj_reg_top[i],
  ext_proj_reg_left[i],
  ext_packed_reg_width[i], ext_packed_reg_height[i],
  ext_packed_reg_top[i], and
  ext_packed_reg_left[i], respectively.
ext_proj_reg_width[i], ext_proj_reg_height[i], ext_proj_reg_top[i], and ext_proj_reg_left[i]
  are specified as proj_reg_width[i], proj_reg_height[i],
  proj_reg_top[i], and
  proj_reg_left[i] except if scale_factor_proj > 0, then the following applies:
        ext_proj_reg_width[i],ext_proj_reg_height[i], ext_proj_reg_top[i], and
        ext_proj_reg_left[i] multiplied by scale_factor_proj specify the scaled
        width, height, top offset, and left offset, respectively, of the i-th packed
        region.

```
ext_packed_reg_width[i], ext_packed_reg_height[i], ext_packed_reg_top[i], and
  ext_packed_reg_left[i] are specified
  as packed_reg_width[i], packed_reg_height[i],
  packed_reg_top[i], and packed_reg_left[i] with
  the following exceptions:
      if scale_factor_packed is set to a non-zero value then
      ext_packed_reg_width[i], ext_packed_reg_height[i],
      ext_packed_reg_top[i], and ext_packed_reg_left[i] multiplied by
      scale_factor_packed specify the scaled width, height, top offset, and left
      offset, respectively, of the i-th packed region.
7.5.4.3 Syntax of the extended region-wise packing structure
aligned(8) class ExtendedRegionWisePackingStruct( ) {
  unsigned int(1) constituent_picture_matching_flag;
  unsigned int(1) scale_factor_flag
  unsigned int(1) proj_reg_equal_size_flag
  unsigned int(1) packed_reg_equal_size_flag
  unsigned int(1) proj_raster_scan_order_flag
  unsigned int(1) packed_raster_scan_order_flag
  bit(2) reserved = 0;
  if (scale_factor_flag) {
    unsigned int(16) scale_factor_proj;
    unsigned int(16) scale_factor_packed;
  }
  unsigned int(16) num_regions;
  unsigned int(32) proj_picture_width;
  unsigned int(32) proj_picture_height;
  unsigned int(16) packed_picture_width;
  unsigned int(16) packed_picture_height;
  for (i = 0; i < num_regions; i++) {
    bit(3) reserved = 0;
    unsigned int(1) guard_band_flag[i];
    unsigned int(4) packing_type[i];
    if (packing_type[i] == 0) {
      RectExtendedRegionPacking(i, scale_factor_proj,
        scale_factor_packed,
        proj_reg_equal_size_flag,
        packed_reg_equal_size_flag,
        proj_raster_scan_order_flag,
        packed_raster_scan_order_flag);
      if (guard_band_flag[i])
      GuardBand(i);
    }
  }
}
```
7.5.4.4 Semantics of the extended region-wise packing structure
constituent_picture_matching_flag is specified as in 7.5.3.7.
scale_factor_flag equal to 1 specifies that scale_factor_proj and scale_factor_packed are
  signaled. scale_factor_flag equal to 0 specifies that scale_factor_proj and
  scale_factor_packed are not signaled and inferred to be 0.
  NOTE 1: Setting this flag equal to 1 together with setting at least one of
      scale_factor_proj and scale_factor_packed to a non-zero value, allows for
      compact signalling of region-wise packing information.
proj_reg_equal_size_flag equal to 1 specifies that all regions of the projected picture have the
  same width and height. The regions in the left column of the picture may have a shorter
  width than regions in other columns and the regions at the bottom row of the picture
  may have a shorter height than regions in other rows. proj_reg_equal_size_flag equal to
  0 specifies that all regions of the projected picture may not have equal size.
  NOTE 2: For projected regions where the regions have equal size, setting this flag
      equal to 1 allows for more compact signalling of region-wise packing
      information by only signalling the size for the first region.
packed_reg_equal_size_flag equal to 1 specifies that all regions of the packed picture have the
  same width and height. The regions in the left column of the picture may have a shorter
  width than regions in other columns and the regions at the bottom row of the picture
  may have a shorter height than regions in other rows. packed_reg_equal_size_flag equal
  to 0 specifies that all regions of the packed picture may not have equal size.
  NOTE 3: For packed regions where the regions have equal size, setting this flag equal
      to 1 allows for more compact signalling of region-wise packing information
      by only signalling the size for the first region.
proj_raster_scan_order_flag equal to 1 specifies that all regions of the projected picture are
  ordered in raster scan order. For stereoscopic frame packing formats the regions are
  ordered in raster scan order for each stereo view. proj_reg_equal_size_flag equal to 0
  specifies that all regions of the projected picture may not be orderered in raster scan
  order.
  NOTE 4: For projected regions where the regions are ordered in raster scan order,
setting this flag equal to 1 allows for more compact signalling of region-wise
packing information by deriving the region offsets from the region width and
region height.
packed_raster_scan_order_flag equal to 1 specifies that all regions of the packed picture are
  ordered in raster scan order. For stereoscopic frame packing formats the regions are ordered in raster scan order for each stereo view. packed_reg_equal_size_flag equal to 0 specifies that all regions of the packed picture may not be ordered in raster scan order.
NOTE 5:For packed regions where the regions are ordered in raster scan order, setting this flag equal to 1 allows for more compact signalling of region-wise packing information by deriving the region offsets from the region width and region height.
scale_factor_proj specify the scale factor to be used to reconstruct the parameters for the projected regions. scale_factor_proj equal to 0 specifies that the values for the projected regions have not been scaled.
scale_factor_packed specify the scale factor to be used to reconstruct the parameters for the packed regions. scale_factor_packed equal to 0 specifies that the values for the packed regions have not been scaled.
num_regions is specified as in 7.5.3.7.
proj_picture_width and proj_picture_height are specified as in 7.5.3.7.
packed_picture_width and packed_picture_height are specified as in 7.5.3.7.
guard_band_flag[i] is specified as in 7.5.3.7.
packing_type[i] is specified as in 7.5.3.7.
RectExtendedRegionPacking( ) specifies the extended version of region-wise packing between the i-th packed region and the i-th projected region. The syntax and semantics of RectExtendedRegionPacking( ) are specified in clauses Error! Reference source not found. and 0, respectively.
GuardBand(i) is specified as in 7.5.3.7.
7.5.4.5 Derivation of extended region-wise packing variables and constraints for the syntax elements of the extended region-wise packing structure
This clause is specified as in Error! Reference source not found. with the following exceptions:
- RegionWisePackingStruct in 7.5.3.8 refers to ExtendedRegionWisePackingStruct.
- packed_reg_left, packed_reg_top, packed_reg_width and packed_reg_height in 7.5.3.8 refers to ext_packed_reg_left, ext_packed_reg_top, ext_packed_reg_width and ext_packed_reg_height, respectively.
- proj_reg_left, proj_reg_top, proj_reg_width and proj_reg_height in 7.5.3.8 refers to ext_proj_reg_left, ext_proj_reg_top, ext_proj_reg_width and ext_proj_reg_height, respectively.
  - If constituent_picture_matching_flag is equal to 0
     if scale_factor_packed > 0, the following applies:
        PackedRegLeft[n] is set equal to ext_packed_reg_left[n] * scale_factor_packed.
        PackedRegTop[n] is set equal to ext_packed_reg_top[n] * scale_factor_packed.
        PackedRegWidth[n] is set equal to ext_packed_reg_width[n] * scale_factor_packed.
        PackedRegHeight[n] is set equal to ext_packed_reg_height[n] * scale_factor_packed.
     If scale_factor_proj > 0, the following applies:
        ProjRegLeft[n] is set equal to ext_proj_reg_left[n] * scale_factor_proj.
        ProjRegTop[n] is set equal to ext_proj_reg_top[n] * scale_factor_proj.
        ProjRegWidth[n] is set equal to ext_proj_reg_width[n] * scale_factor_proj.
        ProjRegHeight[n] is set equal to ext_proj_reg_height[n] * scale_factor_proj.
- Otherwise, if constituent_picture_matching_flag is equal to 1
     If scale_factor_packed > 0, the following applies:
        PackedRegLeft[n] is set equal to ext_packed_reg_left[nIdx] * scale_factor_packed + packedLeftOffset.
        PackedRegTop[n] is set equal to ext_packed_reg_top[nIdx] * scale_factor_packed + packedTopOffset.
        PackedRegWidth[n] is set equal to ext_packed_reg_width[nIdx] * scale_factor_packed.
        PackedRegHeight[n] is set equal to ext_packed_reg_height[nIdx] * scale_factor_packed.
  If scale_factor_proj > 0, the following applies:
        ProjRegLeft[n] is set equal to ext_proj_reg_left[nIdx] * scale_factor_proj + projLeftOffset.
        ProjRegTop[n] is set equal to ext_proj_reg_top[nIdx] * scale_factor_proj + projTopOffset.
        ProjRegWidth[n] is set equal to ext_proj_reg_width[nIdx] * scale_factor_proj.
        ProjRegHeight[n] is set equal to ext_proj_reg_height[nIdx] * scale_factor_proj.

The invention claimed is:
1. A method of generating a backwards compatible bitstream, the method comprising:
  including in an entry, E, of the bitstream a first entry, A, having a first version of a feature defined by a first version of a media bitstream syntax specification; and
  including in the entry, E, of the bitstream a second entry, B, having a second version of the feature defined by an updated version of the media bitstream syntax specification, wherein
  the first entry is a struct, a container, or a box,
  the second entry is a struct, a container, or a box, the media bitstream syntax specification is a first version of ISO/IEC 14496-12, the updated media bitstream syntax specification is an updated version of ISO/IEC 14496-12, and the entry, E, contains information indicating that i) the second version of the feature is an update to the first version of the feature or ii) the second version of the feature is an extension of the first version of the feature.

2. The method of claim 1, wherein the entry, E, is a pointer to, a position of, a struct with, or a container with a set of one or more syntax elements in the bitstream.

3. The method of claim 1, wherein the first version of the feature is region-wise packing and the second version of the feature is an updated version or an extended version of the region-wise packing, and the media bitstream syntax specification is a first version of Omnidirectional Media Format and the updated media bitstream syntax specification is an updated version of Omnidirectional Media Format.

4. The method of claim 1, further comprising including in the entry, E, information indicating that the second version of the feature is an extension of the first version of the feature.

5. A computer program product comprising a non-transitory storage medium including program code, wherein execution of the program code by a processor of a device causes the device to perform the method of claim 1.

6. A method for parsing and processing a media bitstream, the method comprising:

receiving an entry, E, contained in the media bitstream;

parsing the entry E;

determining that the entry, E, contains both i) a first entry, A, containing a first version of a feature conforming to a first version of a media bitstream syntax specification and ii) a second entry, B, containing a second version of the feature conforming to an updated version of the media bitstream syntax specification, wherein the entry, E, contains information indicating that the second version of the feature is an extension of the first version of the feature;

determining, based the information contained in the entry, E, that the second version of the feature is an extension of the first version of the feature;

parsing the second entry; and responsive to determining that the second version of the feature is an extension of the first version of the feature, combining the first version of the feature from the first entry and the second version of the feature from the second entry, wherein the first entry is a struct, a container, or a box, the second entry is a struct, a container, or a box, the media bitstream syntax specification is a first version of ISO/IEC 14496-12, and the updated media bitstream syntax specification is an updated version of ISO/IEC 14496-12.

7. The method of claim 6, wherein the entry, E, is a pointer to, position of, struct with or container with a set of one or more syntax elements in the bitstream.

8. The method of claim 6, wherein the media bitstream is an audio and/or video bitstream.

9. The method of claim 6, wherein the first version of the feature is region-wise packing and the second version of the feature is an extended version of the region-wise packing and wherein the media bitstream syntax specification is a first version of Omnidirectional Media Format and the updated media bitstream syntax specification is an updated version of Omnidirectional Media Format.

10. The method of claim 6, further comprising decoding the first version and the second version of the feature and/or using the first version and the second version of the feature to render the media bitstream.

11. The method of claim 6, wherein the method is performed in a media player.

12. A computer program product comprising a non-transitory storage medium including program code, whereby execution of the program code by a processor of a device causes the device to perform the method of claim 6.

13. A bitstream generator, the bitstream generator being configured to:

include in an entry, E, of the bitstream a first entry, A, having a first version of a feature defined by a first version of a media bitstream syntax specification; and include in the entry, E, of the bitstream a second entry, B, having a second version of the feature defined by an updated version of the media bitstream syntax specification, wherein the first entry is a struct, a container, or a box, the second entry is a struct, a container, or a box, the media bitstream syntax specification is a first version of ISO/IEC 14496-12, the updated media bitstream syntax specification is an updated version of ISO/IEC 14496-12, and the entry, E, contains information indicating that i) the second version of the feature is an update to the first version of the feature or ii) the second version of the feature is an extension of the first version of the feature.

14. The bitstream generator of claim 13, wherein the entry, E, is a pointer to, position of, struct with or container with a set of one or more syntax elements in the bitstream.

15. The bitstream generator of claim 13, wherein the bitstream generator is further configured:

to include in the entry, E, information indicating that the second version of the feature is an extension of the first version of the feature.

16. A device, the device being configured to:

use a receiver to receive a media bitstream containing an entry, E;

parse the entry E, wherein the entry, E, contains both i) a first entry, A, containing a first version of a feature conforming to a first version of a media bitstream syntax specification and ii) a second entry, B, containing a second version of the feature conforming to an updated version of the media bitstream syntax specification;

determine, based on information contained in the entry, E, that the second version of the feature is an extension of the first version of the feature;

parse the second entry; and responsive to determining that the second version of the feature is an extension of the first version of the feature, combine the first version of the feature from the first entry and the second version of the feature from the second entry, wherein the first entry is a struct, a container, or a box, the second entry is a struct, a container, or a box, the media bitstream syntax specification is a first version of ISO/IEC 14496-12, and the updated media bitstream syntax specification is an updated version of ISO/IEC 14496-12.

17. The device of claim 16, wherein the entry, E, is a pointer to, position of, struct with or container with a set of one or more syntax elements in the bitstream.

18. The device of claim 16, wherein the media bitstream is an audio and/or video bitstream.

19. The device of claim 16, being further configured:
to decode the first version and the second version of the feature and/or
to use the first version and the second version of the feature to render the media bitstream.

20. The device of claim 16, being further configured to receive a backwards compatible bitstream.

21. The device of claim 16, wherein the device is a media player.

* * * * *